US012573663B2

(12) United States Patent
Wu et al.

(10) Patent No.: US 12,573,663 B2
(45) Date of Patent: Mar. 10, 2026

(54) NON-AQUEOUS ELECTROLYTE AND PREPARATION METHOD THEREOF, AND SECONDARY BATTERY AND ELECTRIC APPARATUS CONTAINING SAME

(71) Applicant: CONTEMPORARY AMPEREX TECHNOLOGY (HONG KONG) LIMITED, Hong Kong (CN)

(72) Inventors: Zeli Wu, Ningde (CN); Bin Jiang, Ningde (CN); Changlong Han, Ningde (CN); Huiling Chen, Ningde (CN); Lei Huang, Ningde (CN); Cuiping Zhang, Ningde (CN); Jie Guo, Ningde (CN); Wenhao Liu, Ningde (CN)

(73) Assignee: CONTEMPORARY AMPEREX TECHNOLOGY (HONG KONG) LIMITED, Hong Kong (HK)

( * ) Notice: Subject to any disclaimer, the term of this patent is extended or adjusted under 35 U.S.C. 154(b) by 124 days.

(21) Appl. No.: 18/503,190

(22) Filed: Nov. 7, 2023

(65) Prior Publication Data

US 2024/0079651 A1 Mar. 7, 2024

Related U.S. Application Data

(63) Continuation of application No. PCT/CN2022/097310, filed on Jun. 7, 2022.

(51) Int. Cl.
| | |
|---|---|
| *H01M 10/0567* | (2010.01) |
| *H01M 10/052* | (2010.01) |
| *H01M 10/0568* | (2010.01) |
| *H01M 10/0569* | (2010.01) |
| H01M 4/02 | (2006.01) |

(52) U.S. Cl.
CPC ..... *H01M 10/0567* (2013.01); *H01M 10/052* (2013.01); *H01M 10/0568* (2013.01); *H01M 10/0569* (2013.01); *H01M 2004/027* (2013.01); *H01M 2004/028* (2013.01); *H01M 2300/0028* (2013.01)

(58) Field of Classification Search
None
See application file for complete search history.

(56) References Cited

U.S. PATENT DOCUMENTS

| 7,879,499 B2 | 2/2011 | Kim et al. |
| 2006/0204846 A1 | 9/2006 | Sunagawa et al. |

| 2012/0276445 A1 | 11/2012 | Xu |
| 2015/0125759 A1 | 5/2015 | Xu et al. |
| 2020/0321655 A1 | 10/2020 | Vaughey et al. |

FOREIGN PATENT DOCUMENTS

| CN | 101663790 A | 3/2010 |
|---|---|---|
| CN | 105186034 A | 12/2015 |
| CN | 105449272 A | 3/2016 |
| CN | 106797021 A | 5/2017 |
| CN | 107534185 A | 1/2018 |
| CN | 109599591 A | 4/2019 |
| CN | 106133987 B | 7/2019 |
| CN | 113906604 A | 1/2022 |
| EP | 3306732 A1 | 4/2018 |
| JP | 2010097820 A | 4/2010 |
| JP | 2013051122 A | 3/2013 |
| JP | 2021170451 A | 10/2021 |
| JP | 202253407 A | 7/2022 |
| JP | 2023549974 A | 11/2023 |
| JP | 2024527216 A | 7/2024 |
| WO | 2016085666 A1 | 6/2016 |
| WO | 2022102682 A1 | 5/2022 |

OTHER PUBLICATIONS

International Search Report received in the corresponding International Application PCT/CN2022/097310, mailed Mar. 3, 2023.
The extended European search report received in the corresponding European Application 22927578.9, mailed on May 14, 2024.
Decision to Grant a Patent received in the corresponding Japanese Application 2023-552364, mailed on Sep. 10, 2024.

*Primary Examiner* — Carlos Barcena

(74) *Attorney, Agent, or Firm* — K&L Gates LLP

(57) ABSTRACT

Provided are a non-aqueous electrolyte and a preparation method thereof, and a secondary battery and an electric apparatus containing the same. The non-aqueous electrolyte contains a non-aqueous solvent and lithium ions, first cations, and first anions dissolved therein, where the first cation is a metal cation $Me^{n+}$ other than the lithium ion, n representing a chemical valence of the metal cation; the first anion is a difluorooxalate borate anion $DFOB^-$; mass concentration of the first cations in the non-aqueous electrolyte is D1 ppm, and mass concentration of the first anions in the non-aqueous electrolyte is D2 ppm, both based on total mass of the non-aqueous electrolyte; and the non-aqueous electrolyte satisfies that D1 is 0.5 to 870 and that D1/D2 is 0.02 to 2. The non-aqueous electrolyte in this application enables the secondary battery to have good cycling performance, safety performance, and kinetic performance.

19 Claims, 3 Drawing Sheets

5

5

NON-AQUEOUS ELECTROLYTE AND PREPARATION METHOD THEREOF, AND SECONDARY BATTERY AND ELECTRIC APPARATUS CONTAINING SAME

CROSS REFERENCE TO RELATED MATTER

This application is a continuation of international application PCT/CN2022/097310, filed Jun. 7, 2022 and entitled "NON-AQUEOUS ELECTROLYTE AND PREPARATION METHOD THEREOF, AND SECONDARY BATTERY AND ELECTRIC APPARATUS CONTAINING SAME", the entire content of which is hereby incorporated by reference in its entirety.

TECHNICAL FIELD

This application pertains to the field of battery technologies and specifically, relates to a non-aqueous electrolyte and a preparation method thereof, and a secondary battery and an electric apparatus containing the same.

BACKGROUND

In recent years, secondary batteries have been widely used in energy storage power supply systems such as hydroelectric, thermal, wind, and solar power plants, and many other fields including electric tools, electric bicycles, electric motorcycles, electric vehicles, military equipment, and aerospace. With the application and popularization of secondary batteries, comprehensive performance of secondary batteries has received increasing attention. For example, secondary batteries need to have long cycle life, high safety performance, and good rate performance. Therefore, how a secondary battery with good comprehensive performance is provided is a technical problem that needs to be urgently solved.

SUMMARY

An objective of this application is to provide a non-aqueous electrolyte and a preparation method thereof, and a secondary battery and an electric apparatus containing the same, so as to enable the secondary battery to have good cycling performance, safety performance, and kinetic performance.

A first aspect of this application provides a non-aqueous electrolyte containing a non-aqueous solvent and lithium ions, first cations, and first anions dissolved therein, where the first cation is a metal cation $Me^{n+}$ other than the lithium ion, n representing a chemical valence of the metal cation; the first anion is a difluorooxalate borate anion $DFOB^-$; mass concentration of the first cations in the non-aqueous electrolyte is D1 ppm, and mass concentration of the first anions in the non-aqueous electrolyte is D2 ppm, both based on total mass of the non-aqueous electrolyte; and the non-aqueous electrolyte satisfies that D1 is 0.5 to 870 and that D1/D2 is 0.02 to 2.

The inventors of this application have surprisingly found during research that when the mass concentration D1 ppm of the first cations and the mass concentration D2 ppm of the first anions in the non-aqueous electrolyte satisfy that D1 is 0.5 to 870 and that D1/D2 is 0.02 to 2, the first cations do not deteriorate the electrochemical performance of the secondary battery, and with the synergistic effect of the first cations and first anions, the non-aqueous electrolyte in this application also enables the secondary battery to have good cycling performance, safety performance, and kinetic performance.

In any embodiment of this application, a difference between a standard reduction potential of $Me^{n+}$ and a standard reduction potential of $Li^+$ is 1.0 V or more, and optionally, $Me^{n+}$ represents at least one of $Ni^{2+}$, $Co^{2+}$, $Mn^{2+}$, $Al^{3+}$, and $Fe^{2+}$. This better ensures that $Me^{n+}$ is reduced before the lithium ions, thereby better reducing irreversible consumption of active lithium ions during SEI film formation and improving the capacity retention rate of the secondary battery.

In any embodiment of this application, D1 is 100 to 870 and optionally 200 to 870. This enables the secondary battery to have high capacity retention rate, low volume swelling rate, and good kinetic performance.

In any embodiment of this application, D1/D2 is 0.3 to 2 and optionally 0.3 to 1.2. This is conducive to fully utilizing the synergistic effect between the first cations and first anions, thereby enabling the secondary battery to have good cycling performance, safety performance, and kinetic performance.

In any embodiment of this application, D2 is 1 to 3000 and optionally 100 to 2000. This enables the secondary battery to have high capacity retention rate, low volume swelling rate, and good kinetic performance.

In any embodiment of this application, the non-aqueous electrolyte further contains second anions, where the second anion is a tetrafluoroborate anion $BF_4^-$. Mass concentration of the second anions in the non-aqueous electrolyte is D3 ppm based on the total mass of the non-aqueous electrolyte. Optionally, D3 is 1 to 3000 and more optionally 1 to 2000. This can improve the high-temperature stability and low-temperature performance of the secondary battery.

In any embodiment of this application, optionally, D2/D3 is 0.4 to 20 and more optionally 1 to 10. This helps to fully utilize the synergistic effect between $BF_4^-$ and $DFOB^-$, thereby not only expanding an electrochemical window of the non-aqueous electrolyte, but also forming a stable and low-impedance SEI film on the surface of a negative electrode active material.

In any embodiment of this application, the non-aqueous electrolyte further contains third anions, where the third anion includes at least one of perchlorate anion $ClO_4^-$, bis(trifluoromethanesulfonyl)imide anion $N(SO_2CF_3)_2^-$, $NO_3^-$, and $SO_4^{2-}$ and optionally includes at least one of $NO_3^-$ and $SO_4^{2-}$. Mass concentration of the third anions in the non-aqueous electrolyte is D4 ppm based on the total mass of the non-aqueous electrolyte. Optionally, D4 is 1 to 3000 and more optionally 1 to 2000. The third anions contribute to the high thermal stability of the non-aqueous electrolyte, thereby improving the high-temperature stability of the secondary battery. The third anions further help $DFOB^-$ to become free ions to reduce association of anions and cations, thereby fully utilizing the effect of $DFOB^-$ on improving the capacity retention rate and kinetic performance of the secondary battery.

In any embodiment of this application, mass concentration of the third anions in the non-aqueous electrolyte is D4 ppm. Optionally, D2/D4 is 0.4 to 20 and more optionally 0.8 to 5. This helps to fully utilize the synergistic effect between the first anions and the third anions, thereby not only improving the thermal stability of the non-aqueous electrolyte, but also forming a stable and low-impedance SEI film on the surface of the negative electrode active material.

In any embodiment of this application, the non-aqueous electrolyte further contains fourth anions, where the fourth anion includes hexafluorophosphate anion $PF_6^-$, bis(fluorosulfonyl)imide anion $N(SO_2F)_2^-$, or a combination thereof.

In any embodiment of this application, optionally, mass percentage of the fourth anions in the non-aqueous electrolyte is 8% to 20% and more optionally 9% to 15% based on the total mass of the non-aqueous electrolyte.

In any embodiment of this application, optionally, the fourth anions include both hexafluorophosphate anions $PF_6^-$ and bis(fluorosulfonyl)imide anions $N(SO_2F)_2^-$, and more optionally, a mass ratio α of the hexafluorophosphate anions $PF_6^-$ and the bis(fluorosulfonyl)imide anions $N(SO_2F)_2^-$ is 0.2 to 3 and more optionally 0.5 to 1.5. In this way, the non-aqueous electrolyte is not prone to hydrolysis and can have higher thermal stability and contribute to the formation of an interface film with a lower impedance.

In any embodiment of this application, the non-aqueous electrolyte further contains fifth anions, where the fifth anion includes at least one of dioxalate borate anion $BOB^-$, hexafluoroarsenate anion $AsF_6^-$, trifluoromethanesulfonate anion $CF_3SO_3^-$, difluorophosphate anion $PO_2F_2^-$, difluorodioxalate phosphate anion $DODFP^-$, and tetrafluoroxalate phosphate anion $OTFP$. This further improves the interface performance of the positive and/or negative electrode or the ionic conductivity or thermal stability of the non-aqueous electrolyte.

In any embodiment of this application, optionally, mass percentage of the fifth anions in the non-aqueous electrolyte is 2% or less and more optionally 0.5% or less based on the total mass of the non-aqueous electrolyte.

In any embodiment of this application, the fifth anions include difluorophosphate anions $PO_2F_2^-$. Optionally, a mass ratio β of the difluorophosphate anions $PO_2F_2$ and the fourth anions is 0.01 to 0.15 and more optionally 0.01 to 0.1. This can increase the ionic conductivity of the non-aqueous electrolyte, improve the property of a positive electrode interface film and/or negative electrode interface film, and help to construct a stable and low-impedance positive electrode interface film and/or negative electrode interface film, thereby effectively reducing decomposition of the non-aqueous electrolyte and further improving the kinetic performance and safety performance of the secondary battery.

In any embodiment of this application, the non-aqueous solvent includes a cyclic carbonate compound and a linear carbonate compound, where in the non-aqueous electrolyte, mass percentage of the cyclic carbonate compound is E1 and mass percentage of the linear carbonate compound is E2, both based on the total mass of the non-aqueous electrolyte; E1 is 5% to 40% and optionally 10% to 30%; and E2 is 40% to 85% and optionally 60% to 80%. This helps the non-aqueous electrolyte to obtain suitable viscosity and ionic conductivity, which in turn facilitates the transport of lithium ions.

In any embodiment of this application, the non-aqueous solvent further includes an ether compound, where the ether compound includes at least one of tetrahydrofuran, 2-methyltetrahydrofuran, 1,3-dioxolane, ethylene glycol monomethyl ether, dimethoxyethane, tetraethylene glycol dimethyl ether, dimethoxymethane, and diglyme. The ether compound helps the non-aqueous electrolyte to obtain suitable viscosity and/or ionic conductivity, which in turn facilitates the transport of lithium ions.

In any embodiment of this application, mass percentage of the ether compound in the non-aqueous electrolyte is E3 based on the total mass of the non-aqueous electrolyte; and optionally, E3 is 0.1% to 40% and more optionally 0.5% to 20%.

In any embodiment of this application, the non-aqueous electrolyte further contains a first additive, where the first additive is fluoroethylene carbonate. This can effectively improve the cycling performance of the secondary battery.

In any embodiment of this application, mass concentration of the first additive in the non-aqueous electrolyte is D5 ppm based on the total mass of the non-aqueous electrolyte; and optionally, D5 is 1 to 30,000 and more optionally 100 to 20,000.

In any embodiment of this application, mass concentration of the first additive in the non-aqueous electrolyte is D5 ppm; and optionally, D5/D2 is 5 to 500 and more optionally 5 to 100. This can fully utilize the synergistic effect between FEC and $DFOB^-$, thereby further improving the cycling performance of the secondary battery without significantly increasing the gas production of the secondary battery.

In any embodiment of this application, the non-aqueous electrolyte further contains a second additive, where the second additive includes at least one of vinylidene carbonate, lithium oxalate, vinyl sulfate, and 1,3-propane sultone. The second additive helps to further improve the interface performance of the positive and/or negative electrode, thereby further improving at least one of the cycling performance, safety performance, and kinetic performance of the secondary battery.

In any embodiment of this application, optionally, mass percentage of the second additive in the non-aqueous electrolyte is 5% or less and more optionally 2.5% or less based on the total mass of the non-aqueous electrolyte.

A second aspect of this application provides a preparation method of non-aqueous electrolyte. The method includes the following step: mixing a non-aqueous solvent, a lithium salt, a soluble Me salt, soluble difluorooxalate borate, and an optional additive to uniformity to obtain a non-aqueous electrolyte, where Me represents a metal element other than element lithium; where the non-aqueous electrolyte contains the non-aqueous solvent and lithium ions, first cations, and first anions dissolved therein, where the first cation is a metal cation $Me^{n+}$ other than the lithium ion, n representing a chemical valence of the metal cation; the first anion is a difluorooxalate borate anion $DFOB^-$; mass concentration of the first cations in the non-aqueous electrolyte is D1 ppm, and mass concentration of the first anions in the non-aqueous electrolyte is D2 ppm, both based on total mass of the non-aqueous electrolyte; and the non-aqueous electrolyte satisfies that D1 is 0.5 to 870 and that D1/D2 is 0.02 to 2.

In any embodiment of this application, a difference between a standard reduction potential of $Me^{n+}$ and a standard reduction potential of $Li^+$ is 1.0 V or more, and optionally, $Me^{n+}$ represents at least one of $Ni^{2+}$, $Co^{2+}$, $Mn^{2+}$, $Al^{3+}$, and $Fe^{2+}$.

In any embodiment of this application, the soluble Me salt includes at least one of $Me(DFOB)_n$, $Me(BF_4)_n$, $Me(ClO_4)_n$, $Me[N(SO_2CF_3)_2]n$, $Me(NO_3)_n$, $Me(SO_4)_{n/2}$, $Me(PF_6)_n$, $Me[N(SO_2F)_2]_n$, $Me(BOB)_n$, $Me(AsF_6)_n$, $Me(CF_3SO_3)_n$, $Me(PO_2F_2)_n$, $Me(DODFP)_n$, and $Me(OTFP)_n$. This helps to regulate the mass concentrations of the metal cations and different anions in the non-aqueous electrolyte within the desired ranges.

In any embodiment of this application, the soluble difluorooxalate borate includes at least one of $Me(DFOB)_n$ and LiDFOB. This helps to regulate the mass concentrations of the metal cations and the first anions in the non-aqueous electrolyte within the desired ranges.

In any embodiment of this application, the non-aqueous solvent includes a cyclic carbonate compound and a linear carbonate compound, and optionally, the non-aqueous solvent includes a cyclic carbonate compound, a linear carbonate compound, and an ether compound. This helps to regulate the mass concentrations of the metal cations and different anions in the non-aqueous electrolyte within the desired ranges.

In any embodiment of this application, the lithium salt includes a first lithium salt, the first lithium salt including lithium hexafluorophosphate, lithium bis(fluorosulfonyl)imide, or a combination thereof, and optionally, the lithium salt further includes a second lithium salt, the second lithium salt including at least one of lithium bis(oxalato)borate, lithium tetrafluoroborate, lithium bis(trifluoromethanesulfonyl)imide, lithium perchlorate, lithium hexafluoroarsenate, lithium trifluoromethanesulfonate, lithium difluorophosphate, lithium difluorobis(oxalato)phosphate, and lithium tetrafluoro(oxalato)phosphate. This helps to regulate the mass concentrations of the metal cations and different anions in the non-aqueous electrolyte within the desired ranges.

In any embodiment of this application, the additive includes at least one of a first additive and a second additive, where the first additive is fluoroethylene carbonate, and the second additive includes at least one of vinylidene carbonate, lithium oxalate, vinyl sulfate, and 1,3-propane sultone.

A third aspect of this application provides a secondary battery including a positive electrode plate, a negative electrode plate, and a non-aqueous electrolyte, where the non-aqueous electrolyte is the non-aqueous electrolyte according to the first aspect of this application or a non-aqueous electrolyte obtained using the preparation method according to the second aspect of this application.

In any embodiment of this application, the positive electrode plate includes a layered material having a molecular formula of $Li_aNi_bCo_cMn_dAl_eM_fO_gA_h$, M represents transition metal site doping cation, A represents oxygen site doping anion, $0.8 \le a \le 1.2$, $0 \le b \le 1$, $0 \le c \le 1$, $0 \le d \le 1$, $0 \le e \le 1$, $0 \le f \le 0.2$, $0 \le g \le 2$, $0 \le h \le 2$, $b+c+d+e+f+f=1$, and $g+h=2$.

In any embodiment of this application, optionally, M is at least one selected from Si, Ti, Mo, V, Ge, Se, Zr, Nb, Ru, Pd, Sb, Ce, Te, and W.

In any embodiment of this application, optionally, A is at least one selected from F, N, P, and S, and more optionally, A is selected from F.

In any embodiment of this application, optionally, $0 < b < 0.98$, and more optionally, $0.50 \le b < 0.98$.

In any embodiment of this application, optionally, $c=0$.

In any embodiment of this application, optionally, $0 < c \le 0.20$, and more optionally, $0 < c \le 0.10$.

In any embodiment of this application, optionally, $d=0$ and $0 < e < 0.50$, and more optionally, $d=0$ and $0 < e \le 0.10$.

In any embodiment of this application, optionally, $e=0$ and $0 < d < 0.50$, and more optionally, $e=0$ and $0 < d \le 0.10$.

In any embodiment of this application, optionally, $0 < d < 0.50$ and $0 < e < 0.50$, and more optionally, $0 < d \le 0.30$ and $0 < e \le 0.10$.

A fourth aspect of this application provides an electric apparatus including the secondary battery according to the third aspect of this application.

The secondary battery in this application can have good cycling performance, safety performance, and kinetic performance. The electric apparatus in this application includes the secondary battery provided in this application and thus has at least the same advantages as the secondary battery.

BRIEF DESCRIPTION OF DRAWINGS

To describe the technical solutions of the embodiments of this application more clearly, the following briefly describes the accompanying drawings for describing the embodiments of this application. Apparently, the accompanying drawings in the following descriptions show only some embodiments of this application, and persons of ordinary skill in the art may still derive other drawings from these accompanying drawings without creative efforts.

Figure 1:
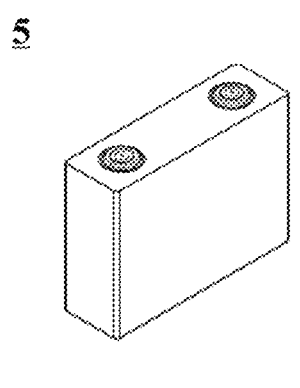
FIG. 1 is a schematic diagram of an embodiment of a secondary battery in this application.

In the accompanying drawings, the figures are not necessarily drawn to scale. Reference signs are as follows: 1. battery pack, 2. upper box body, 3. lower box body, 4. battery module, 5. secondary battery, 51. housing, 52. electrode assembly, and 53. cover plate.

DESCRIPTION OF EMBODIMENTS

The following specifically discloses in detail embodiments of a non-aqueous electrolyte and a preparation method thereof, and a secondary battery and an electric apparatus containing the same in this application, with appropriate reference to the accompanying drawings. However, there may be cases where unnecessary detailed descriptions are omitted. For example, detailed descriptions of well-known matters and repeated descriptions of actually identical structures have been omitted. This is to avoid unnecessarily prolonging the following description, for ease of understanding by persons skilled in the art. In addition, the accompanying drawings and the following descriptions are provided for persons skilled in the art to fully understand this application and are not intended to limit the subject matter recorded in the claims.

"Ranges" disclosed in this application are defined in the form of lower and upper limits. A given range is defined by one lower limit and one upper limit selected, where the selected lower and upper limits define boundaries of that particular range. Ranges defined in this method may or may not include end values, and any combinations may be used, meaning any lower limit may be combined with any upper limit to form a range. For example, if ranges of 60-120 and 80-110 are provided for a specific parameter, it is understood that ranges of 60-110 and 80-120 can also be envisioned. In addition, if minimum values of a range are given as 1 and 2, and maximum values of the range are given as 3, 4, and 5, the following ranges can all be envisioned: 1-3, 1-4, 1-5, 2-3, 2-4, and 2-5. In this application, unless otherwise stated, a value range of "a-b" is a short representation of any combination of real numbers between a and b, where both a and b are real numbers. For example, a value range of "0-5" means that all real numbers in the range of "0-5" are listed herein, and "0-5" is just a short representation of a combination of these values. In addition, a parameter expressed as an integer greater than or equal to 2 is equivalent to disclosure that the parameter is, for example, an integer among 2, 3, 4, 5, 6, 7, 8, 9, 10, 11, 12, and so on.

Unless otherwise specified, all the embodiments and optional embodiments of this application can be combined with each other to form new technical solutions, and such technical solutions should be considered to be included in the disclosure of this application.

Unless otherwise specified, all the technical features and optional technical features of this application can be combined with each other to form new technical solutions, and such technical solutions should be considered to be included in the disclosure of this application.

Unless otherwise specified, all the steps in this application can be performed in the order described or in random order, preferably, in the order described. For example, a method including steps (a) and (b) indicates that the method may include steps (a) and (b) performed in order or may include steps (b) and (a) performed in order. For example, the foregoing method may further include step (c), which indicates that step (c) may be added to the method in any ordinal position, for example, the method may include steps (a), (b), and (c), steps (a), (c), and (b), steps (c), (a), and (b), or the like.

Unless otherwise specified, "include" and "contain" mentioned in this application are inclusive or may be exclusive. For example, the terms "include" and "contain" can mean that other unlisted components may also be included or contained, or only listed components are included or contained.

Unless otherwise specified, in this application, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

In this application, the term "a plurality of" means two or more than two and the term "a plurality of types" means two types or more than two types.

With the application and popularization of secondary batteries, comprehensive performance of secondary batteries has received increasing attention. Non-aqueous electrolyte is one of the key factors affecting the performance of secondary batteries. Currently, the most widely commercialized non-aqueous electrolyte system is a mixed carbonate solution containing lithium hexafluorophosphate. However, lithium hexafluorophosphate has poor thermal stability in high-temperature environments and decomposes at high temperatures to form LiF and $PF_5$. LiF increases the interfacial impedance. $PF_5$ has strong Lewis acidity and interacts with lone pair electrons of an oxygen atom in a solvent molecule to decompose a solvent. In addition, $PF_5$ is highly sensitive to trace water in a non-aqueous electrolyte and generates HF when coming into contact with water. This increases the acidity of the non-aqueous electrolyte and thus leads to easy corrosion of the positive electrode active material and positive electrode current collector, dissolution of transition metal ions in the positive electrode active material, and degradation of the structural stability of the positive electrode active material, affecting the service life of secondary batteries.

In addition, at present, researchers usually consider all metal cations except lithium ions in a non-aqueous electrolyte as foreign matters or impurities that seriously affect the electrochemical performance of the secondary battery. However, the inventors of this application have surprisingly found through extensive research that when a non-aqueous electrolyte contains suitable amounts of both the metal cations $Me^{n+}$ and difluorooxalate borate anions $DFOB^-$ as described below, the metal cations $Me^{n+}$ do not deteriorate the electrochemical performance of the secondary battery, but enable the secondary battery using the non-aqueous electrolyte in this application to have good cycling performance, safety performance, and kinetic performance.

Non-Aqueous Electrolyte

Specifically, a first aspect of this application provides a non-aqueous electrolyte.

The non-aqueous electrolyte contains a non-aqueous solvent and lithium ions, first cations, and first anions dissolved therein, where the first cation is a metal cation $Me^{n+}$ other than the lithium ion, n representing a chemical valence of the metal cation; the first anion is a difluorooxalate borate anion $DFOB^-$; mass concentration of the first cations in the non-aqueous electrolyte is D1 ppm, and mass concentration of the first anions in the non-aqueous electrolyte is D2 ppm, both based on total mass of the non-aqueous electrolyte; and the non-aqueous electrolyte satisfies that D1 is 0.5 to 870 and that D1/D2 is 0.02 to 2.

It should be noted that the metal cations $Me^{n+}$ in the non-aqueous electrolyte in this application are obtained by adding a soluble salt containing element Me to the non-aqueous electrolyte and dissociating the soluble salt, but do not originate from impurity phases in respective raw materials for preparation of the non-aqueous electrolyte. In addition, the performance improvement of the secondary battery is mainly attributed to the soluble salt containing element Me added during the preparation of the non-aqueous electrolyte and $Me^{n+}$ dissociated therefrom, rather than the metal cations dissolved out of a positive electrode active material into the non-aqueous electrolyte during use of the secondary battery.

The inventors of this application have surprisingly found during research that when the mass concentration D1 ppm of the first cations and the mass concentration D2 ppm of the first anions in the non-aqueous electrolyte satisfy that D1 is 0.5 to 870 and that D1/D2 is 0.02 to 2, the first cations do not deteriorate the electrochemical performance of the secondary battery, and with the synergistic effect of the first cations and first anions, the non-aqueous electrolyte in this application also enables the secondary battery to have good cycling performance, safety performance, and kinetic performance. Although the mechanism is not clear, the inventors of this application speculate that the possible reasons include at least the following ones.

First, the metal cations $Me^{n+}$ are more active than the lithium ions in terms of electrochemical activity and thus reduced before the lithium ions, thereby reducing irreversible consumption of active lithium ions during SEI film formation and improving the capacity retention rate of the secondary battery.

Second, the metal element formed by reduction of the metal cations $Me^{n+}$ at the negative electrode has higher electronic conductivity and can facilitate electron transfer and formation of a thicker SEI film on the surface of the negative electrode active material, thereby reducing interfacial side reactions between the negative electrode active material and the non-aqueous electrolyte, improving the capacity retention rate of the secondary battery, and reducing the volume swelling rate of the secondary battery.

Third, the difluorooxalate borate anions $DFOB^-$ participate in the formation of an SEI film on the surface of the negative electrode active material to play the role of modifying the SEI film and improving the composition of the SEI film, thereby facilitating the formation of a low-impedance SEI film and reducing the impedance of the secondary battery.

Fourth, the difluorooxalate borate anion $DFOB^-$ contains an oxalate group, and the oxalate group is oxidized to form carbon dioxide gas when heated. Therefore, when the secondary battery is in a state of abuse such as overcharge or short circuit, carbon dioxide gas generated increases the internal pressure of the battery so that a safety valve of the battery can be quickly blown open to prevent the secondary battery from catching fire or even exploding, thereby improving the safety performance of the secondary battery.

Fifth, researchers usually believe that a thicker SEI film increases the impedance of the secondary battery and deteriorates the kinetic performance of the secondary battery, but the inventors of this application have surprisingly found that when the mass concentration D1 ppm of the first cations and the mass concentration D2 ppm of the first anions in the non-aqueous electrolyte satisfy that D1 is 0.5 to 870 and that D1/D2 is 0.02 to 2, the impedance of the secondary battery is reduced despite the formation of a thicker SEI film on the surface of the negative electrode active material, and thus the secondary battery has good kinetic performance and long life.

The mass concentration of the first cations in the non-aqueous electrolyte is D1 ppm, and D1 is 0.5 to 870. When D1 is in the proper range, the secondary battery can have high capacity retention rate, low volume swelling rate, and good kinetic performance. When the mass concentration of the first cations is too low, improvement is barely made. This is because the first cations cannot be reduced to form metal element at the negative electrode, and consequently, neither electronic conductivity can be increased nor irreversible consumption of active lithium ions can be reduced. As a result, neither the capacity retention rate of the secondary battery can be effectively increased nor the volume swelling rate of the secondary battery can be effectively reduced. When the mass concentration of the first cations is too high, the SEI film on the surface of the negative electrode active material is too thick and therefore the kinetic performance of the secondary battery is poor. In addition, when the mass concentration of the first cations is too high, the negative effect of the first cations on the SEI film is greater compared with the improvement of the first cations on the SEI film. In this case, too much metal element catalyzes decomposition of the SEI film. In this process, first, much gas is generated to make the secondary battery swell, affecting the safety performance of the secondary battery; second, by-products generated in decomposition are deposited on the surface of the SEI film to hinder lithium ion transport, increasing the impedance of the secondary battery; and third, to supplement the lost SEI film, active lithium ions in the non-aqueous electrolyte and battery are consumed continuously, bringing about irreversible impact on the capacity retention rate of the secondary battery. Optionally, D1 may be 1 to 870, 1 to 800, 1 to 700, 1 to 600, 1 to 500, 10 to 870, 10 to 800, 10 to 700, 10 to 600, 10 to 500, 50 to 870, 50 to 800, 50 to 700, 50 to 600, 50 to 500, 100 to 870, 100 to 800, 100 to 700, 100 to 600, 100 to 500, 200 to 870, 200 to 800, 200 to 700, 200 to 600, 200 to 500, 300 to 870, 300 to 800, 300 to 700, 300 to 600, or 300 to 500.

The mass concentration D1 ppm of the first cations and the mass concentration D2 ppm of the first anions in the non-aqueous electrolyte further satisfy that D1/D2 is 0.02 to 2. This is conducive to fully utilizing the synergistic effect between the first cations and first anions, thereby enabling the secondary battery to have good cycling performance, safety performance, and kinetic performance. When D1/D2 is too small, the SEI film is mainly modified by the first anions. Consequently, the first cations can barely make improvement, and neither the capacity retention rate of the secondary battery can be effectively increased nor the volume swelling rate of the secondary battery can be effectively reduced. When D1/D2 is too large, the SEI film is too thick and the kinetic performance of the secondary battery is poor. In addition, when D1/D2 is too large, the improvement of the first anions on modification of the SEI film and reduction of the negative electrode interface impedance is less compared with the negative effect of the first cations on the SEI film. In this case, too much metal element catalyzes decomposition of the SEI film. In this process, first, much gas is generated to make the secondary battery swell, affecting the safety performance of the secondary battery; second, by-products generated in decomposition are deposited on the surface of the SEI film to hinder lithium ion transport, increasing the impedance of the secondary battery; and third, to supplement the lost SEI film, active lithium ions in the non-aqueous electrolyte and battery are consumed continuously, bringing about irreversible impact on the capacity retention rate of the secondary battery. Optionally, D1/D2 is 0.1 to 2, 0.1 to 1.8, 0.1 to 1.6, 0.1 to 1.4, 0.1 to 1.2, 0.1 to 1, 0.1 to 0.9, 0.1 to 0.8, 0.1 to 0.7, 0.1 to 0.6, 0.2 to 2, 0.2 to 1.8, 0.2 to 1.6, 0.2 to 1.4, 0.2 to 1.2, 0.2 to 1, 0.2 to 0.9, 0.2 to 0.8, 0.2 to 0.7, 0.2 to 0.6, 0.3 to 2, 0.3 to 1.8, 0.3 to 1.6, 0.3 to 1.4, 0.3 to 1.2, 0.3 to 1, 0.3 to 0.9, 0.3 to 0.8, 0.3 to 0.7, 0.3 to 0.6, 0.5 to 2, 0.5 to 1.8, 0.5 to 1.6, 0.5 to 1.4, 0.5 to 1.2, 0.5 to 1, 0.5 to 0.9, or 0.5 to 0.8.

In some embodiments, the mass concentration of the first anions in the non-aqueous electrolyte is D2 ppm, and optionally, D2 is 1 to 3000. When D2 is in the proper range, the secondary battery can have high capacity retention rate, low volume swelling rate, and good kinetic performance. In addition, the following situations can be effectively avoided. When the mass concentration of the first anions is too low, the first anions cannot play the role of modifying the SEI film and improving the composition of the SEI film, leading to high impedance and low kinetic performance of the secondary battery. When the mass concentration of the first anions is too high, the SEI film is mainly modified by the first anions, and therefore, the first cations cannot serve the function of increasing the electronic conductivity and reducing irreversible consumption of active lithium ions when reduced at the negative electrode to form metal element. As a result, capacity retention rate increasing is not facilitated for the secondary battery. In addition, the first anions are not resistant to oxidation, and an excessive amount of the first anions affects the storage performance of the secondary battery, especially storage performance in high-temperature environments. More optionally, D2 is 10 to 3000, 10 to 2500, 10 to 2000, 10 to 1500, 10 to 1000, 100 to 3000, 100 to 2500, 100 to 2000, 100 to 1500, 100 to 1000, 200 to 3000, 200 to 2500, 200 to 2000, 200 to 1500, 200 to 1000, 500 to 3000, 500 to 2500, 500 to 2000, 500 to 1500, or 500 to 1000.

In this application, the metal cation $Me^{n+}$ represents a metal cation other than the lithium ion, and n is the chemical valence of the metal cation. Optionally, for example, the element Me represents at least one of transition metal element and fifth to seventh main group metal elements, and n is 1, 2, 3, 4, 5, or 6. Optionally, a difference between a standard reduction potential of $Me^{n+}$ (vs. standard hydrogen electrode potential) and a standard reduction potential of $Li^+$ (vs. standard hydrogen electrode potential: −3.04 V) is 1.0 V or more. The difference of 1.0 V or more between the standard reduction potential of $Me^{n+}$ and the standard reduction potential of $Li^+$ can better ensure that $Me^{n+}$ is reduced before the lithium ions, thereby better reducing irreversible consumption of active lithium ions during SEI film formation and improving the capacity retention rate of the secondary battery.

Optionally, Me represents at least one of Ni, Co, Mn, Al, and Fe. More optionally, $Me''^{n+}$ represents at least one of $Ni^{2+}$, $Co^{2+}$, $Mn^{2+}$, $Al^{3+}$, and $Fe^{2+}$.

In some embodiments, optionally, the non-aqueous electrolyte may further contain second anions, and the second anion is a tetrafluoroborate anion $BF_4^-$. Mass concentration of the second anions in the non-aqueous electrolyte is D3 ppm based on the total mass of the non-aqueous electrolyte. Optionally, D3 is 1 to 3000. $BF_4^-$ has high thermal stability and therefore can improve the high-temperature stability of the secondary battery. $BF_4^-$ further has low charge transfer resistance Rct and therefore can improve the low-temperature performance of the secondary battery. $BF_4^-$ can improve the high-temperature stability and low-temperature performance of the secondary battery and expand the electrochemical window of the non-aqueous electrolyte, but the ionic conductivity of $BF_4^-$ is low and a high proportion of $BF_4^-$ is not conducive to the formation of a stable SEI film on the surface of the negative electrode active material. Therefore, the proportion of $BF_4^-$ should not be too large. More optionally, D3 is 1 to 2500, 1 to 2000, 1 to 1500, 1 to 1000, 1 to 500, 50 to 3000, 50 to 2500, 50 to 2000, 50 to 1500, 50 to 1000, 50 to 500, 100 to 3000, 100 to 2500, 100 to 2000, 100 to 1500, 100 to 1000, 100 to 500, 200 to 3000, 200 to 2500, 200 to 2000, 200 to 1500, 200 to 1000, or 200 to 500.

In some embodiments, optionally, the mass concentration D2 ppm of the first anions and the mass concentration D3 ppm of the second anions further satisfy that D2/D3 is 0.4 to 20. The inventors have found through further research that D2/D3 being in a proper range helps to fully utilize the synergistic effect between $BF_4^-$ and $DFOB^-$, thereby not only expanding an electrochemical window of the non-aqueous electrolyte, but also forming a stable and low-impedance SEI film on the surface of a negative electrode active material. More optionally, D2/D3 may be 0.5 to 20, 0.5 to 15, 0.5 to 10, 0.5 to 8, 0.5 to 6, 0.5 to 4, 0.5 to 2, 0.8 to 15, 0.8 to 10, 0.8 to 8, 0.8 to 6, 0.8 to 4, 0.8 to 2, 1 to 15, 1 to 10, 1 to 8, 1 to 6, 1 to 4, or 1 to 2.

In some embodiments, optionally, the non-aqueous electrolyte may further contain third anions, and the third anion includes at least one of perchlorate anion $ClO_4^-$, bis(trifluoromethanesulfonyl)imide anion $N(SO_2CF_3)_2^-$ (TFSI$^-$ for short), $NO_3^-$, and $SO_4^{2-}$ and more optionally includes at least one of $NO_3^-$ and $SO_4^{2-}$. Mass concentration of the third anions in the non-aqueous electrolyte is D4 ppm based on the total mass of the non-aqueous electrolyte. Optionally, D4 is 1 to 3000. The third anions contribute to the high thermal stability of the non-aqueous electrolyte, thereby improving the high-temperature stability of the secondary battery. The third anions further help $DFOB^-$ to become free ions to reduce association of anions and cations, thereby fully utilizing the effect of $DFOB^-$ on improving the capacity retention rate and kinetic performance of the secondary battery. More optionally, D4 is 1 to 2500, 1 to 2000, 1 to 1500, 1 to 1000, 1 to 500, 50 to 3000, 50 to 2500, 50 to 2000, 50 to 1500, 50 to 1000, 50 to 500, 100 to 3000, 100 to 2500, 100 to 2000, 100 to 1500, 100 to 1000, 100 to 500, 200 to 3000, 200 to 2500, 200 to 2000, 200 to 1500, 200 to 1000, or 200 to 500.

In some embodiments, optionally, the mass concentration D2 ppm of the first anions and the mass concentration D4 ppm of the third anions further satisfy that D2/D4 is 0.4 to 20. The inventors have found through further research that D2/D4 being in a proper range helps to fully utilize the synergistic effect between the first anions and the third anions, thereby not only improving the thermal stability of the non-aqueous electrolyte, but also forming a stable and low-impedance SEI film on the surface of a negative electrode active material. More optionally, D2/D4 may be 0.5 to 20, 0.5 to 15, 0.5 to 10, 0.5 to 8, 0.5 to 6, 0.5 to 5, 0.5 to 4, 0.5 to 3, 0.5 to 2, 0.8 to 15, 0.8 to 10, 0.8 to 8, 0.8 to 6, 0.8 to 5, 0.8 to 4, 0.8 to 3, or 0.8 to 2.

In some embodiments, optionally, the non-aqueous electrolyte may contain both the second anions and the third anions as described above. Mass concentration of the second anions in the non-aqueous electrolyte is D3 ppm, and mass concentration of the third anions in the non-aqueous electrolyte is D4 ppm, both based on the total mass of the non-aqueous electrolyte. Optionally, D3 is 1 to 3000, and D4 is 1 to 3000. This not only expands the electrochemical window of the non-aqueous electrolyte and improves the thermal stability of the non-aqueous electrolyte, but also forms a stable and low-impedance SEI film on the surface of the negative electrode active material, thereby better improving the cycling performance, safety performance, and kinetic performance of the secondary battery. More optionally, the non-aqueous electrolyte satisfies that D2/D3 is 0.4 to 20 and that D2/D4 is 0.4 to 20.

In some embodiments, optionally, the non-aqueous electrolyte may further contain fourth anions, and the fourth anion includes hexafluorophosphate anion $PF_6^-$, bis(fluorosulfonyl)imide anion $N(SO_2F)_2^-$ (FSI$^-$ for short), or a combination thereof. Optionally, mass percentage of the fourth anions in the non-aqueous electrolyte is 8% to 20% and more optionally 9% to 18% and further optionally 9% to 15% based on the total mass of the non-aqueous electrolyte.

In the non-aqueous electrolyte in this application, a compound formed by the fourth anions and the lithium ions is used as a primary lithium salt. To be specific, lithium hexafluorophosphate and/or lithium bis(fluorosulfonyl)imide may be used as the primary lithium salt in this application. Lithium hexafluorophosphate has high ionic conductivity and is less likely to corrode a positive electrode current collector, and can improve the overall ionic conductivity and thermal stability of the non-aqueous electrolyte when used as the primary lithium salt. The chemical formula of lithium bis(fluorosulfonyl)imide is $F_2NO_4S_2$. Li, in which the N atom is bonded to two electron-withdrawing sulfonyl groups. This enables the charge on the N atom to be fully delocalized, to allow for low lattice energy and easy dissociation for lithium bis(fluorosulfonyl)imide, thus improving the ionic conductivity of the non-aqueous electrolyte and reducing the viscosity of the non-aqueous electrolyte. In addition, lithium bis(fluorosulfonyl)imide also has good high-temperature resistance and is not prone to hydrolysis, and therefore can form a thinner but more thermally stable interface film with lower impedance on the surface of the negative electrode active material, thus reducing side reactions between the negative electrode active material and the non-aqueous electrolyte.

In some embodiments, the fourth anion includes hexafluorophosphate anion $PF_6^-$. To be specific, lithium hexafluorophosphate (LiPF$_6$) may be used as a primary lithium salt in this application.

In some embodiments, the fourth anion includes bis(fluorosulfonyl)imide anion $N(SO_2F)_2^-$. To be specific, lithium bis(fluorosulfonyl)imide (LiFSI) may be used as a primary lithium salt in this application.

In some embodiments, the fourth anions include both hexafluorophosphate anions $PF_6^-$ and bis(fluorosulfonyl) imide anions $N(SO_2F)_2^-$. To be specific, lithium hexafluorophosphate (LiPF$_6$) and lithium bis(fluorosulfonyl)imide (LiFSI) may be used as a primary lithium salt together in this application. Optionally, a mass ratio $\alpha$ of the hexafluorophosphate anions $PF_6^-$ and the bis(fluorosulfonyl)imide anions $N(SO_2F)_2^{31}$ is 0.2 to 3, and more optionally 0.3 to 2, 0.4 to 1.8, or 0.5 to 1.5. In this way, the non-aqueous electrolyte is not prone to hydrolysis and can have higher thermal stability and contribute to the formation of an interface film with a lower impedance.

In some embodiments, optionally, the non-aqueous electrolyte may further contain fifth anions, where the fifth anion includes at least one of dioxalate borate anion $BOB^-$, hexafluoroarsenate anion $AsF_6^-$, trifluoromethanesulfonate anion $CF_3SO_3^-$, difluorophosphate anion $PO_2F_2^-$, difluorodioxalate phosphate anion $DODFP^-$, and tetrafluoroxalate phosphate anion $OTFP^-$. This can further improve the interface performance of the positive and/or negative electrode or the ionic conductivity or thermal stability of the non-aqueous electrolyte. Optionally, mass percentage of the fifth anions in the non-aqueous electrolyte is 2% or less and more optionally 0.5% or less based on the total mass of the non-aqueous electrolyte.

Optionally, in some embodiments, the fifth anions include difluorophosphate anions $PO_2F_2^-$. This can increase the ionic conductivity of the non-aqueous electrolyte, improve the property of a positive electrode interface film and/or negative electrode interface film, and help to construct a stable and low-impedance positive electrode interface film and/or negative electrode interface film, thereby effectively reducing decomposition of the non-aqueous electrolyte and further improving the kinetic performance and safety performance of the secondary battery. Optionally, a mass ratio $\beta$ of the difluorophosphate anions $PO_2F_2^-$ and the fourth anions is 0.01 to 0.15 and more optionally 0.01 to 0.1.

[Additive]

In some embodiments, optionally, the non-aqueous electrolyte may further contain a first additive, where the first additive is fluoroethylene carbonate (FEC). Mass concentration of the first additive in the non-aqueous electrolyte is D5 ppm based on the total mass of the non-aqueous electrolyte. Optionally, D5 is 1 to 30,000.

For the secondary battery, FEC can undergo reductive decomposition reactions at high potential to form an SEI film with some flexibility on the surface of the negative electrode active material, and can inhibit reductive decomposition of the non-aqueous solvent of lower potential and inhibit intercalation of the non-aqueous solvents into the negative electrode active material. Therefore, when the non-aqueous electrolyte contains FEC, the cycling performance of the secondary battery can be effectively improved. In addition, FEC is resistant to high-voltage oxidation and therefore better matches the high-voltage positive electrode active material, thus facilitating energy density improvement for the secondary battery.

The non-aqueous electrolyte further containing FEC helps to fully utilize the effect of FEC on improving the cycling performance and energy density of the secondary battery. In addition, FEC has a high dielectric constant. Therefore, the non-aqueous electrolyte containing FEC helps $DFOB^-$ in the non-aqueous electrolyte to become free ions to reduce association of anions and cations, thereby fully utilizing the effect of $DFOB^-$ on improving the capacity retention rate and kinetic performance of the secondary battery. However, HF is formed in decomposition of FEC, and HF destroys the structural stability of the positive electrode active material and increases gas production of the secondary battery, deteriorating the storage performance of the secondary battery. Therefore, the proportion of FEC should not be too large.

More optionally, D5 is 1 to 25,000, 1 to 20,000, 1 to 15,000, 1 to 10,000, 1 to 8,000, 1 to 5,000, 1 to 2,000, 100 to 25,000, 100 to 20,000, 100 to 15,000, 100 to 10,000, 100 to 8,000, 100 to 5,000, or 100 to 2,000.

In some embodiments, optionally, the mass concentration D2 ppm of the first anions and the mass concentration D5 ppm of the first additive satisfy that D5/D2 is 5 to 500. The inventors have found through further research that D5/D2 being in a proper range can fully utilize the synergistic effect between FEC and $DFOB^-$, thereby further improving the cycling performance of the secondary battery without significantly increasing the gas production of the secondary battery. More optionally, D5/D2 is 5 to 400, 5 to 300, 5 to 200, 5 to 150, 5 to 100, 5 to 75, 5 to 50, or 5 to 40.

In some embodiments, optionally, the non-aqueous electrolyte may further contain a second additive, and the second additive includes at least one of vinylidene carbonate (VC), lithium oxalate, vinyl sulfate (DTD), 1,3-propane sultone (PS). The second additive helps to further improve the interface performance of the positive and/or negative electrode, thereby further improving at least one of the cycling performance, safety performance, and kinetic performance of the secondary battery. Optionally, mass percentage of the second additive in the non-aqueous electrolyte is 5% or less and more optionally 2.5% or less based on the total mass of the non-aqueous electrolyte.

In some embodiments, optionally, the non-aqueous electrolyte may alternatively contain both the first additive and the second additive. This helps to further improve the interface performance of the positive electrode and/or negative electrode, thereby further improving the cycling performance, safety performance, and kinetic performance of the secondary battery.

[Non-Aqueous Solvent]

In this application, the non-aqueous solvent is primarily configured to dissolve the lithium salt so that the lithium salt forms conductive ions, and reduce association of cations (for example, lithium ions and metal cations $Me^{n+}$) and anions (for example, first anions, second anions, third anions, fourth anions, and fifth anions) in the non-aqueous electrolyte.

In some embodiments, the non-aqueous solvent includes a cyclic carbonate compound and a linear carbonate compound. The cyclic carbonate compound can increase the ionic conductivity of the non-aqueous electrolyte due to its high dielectric constant, and the linear carbonate compound can reduce the viscosity of the non-aqueous electrolyte due to its low viscosity. Thus, the non-aqueous solvent including the cyclic carbonate compound and the linear carbonate compound helps the non-aqueous electrolyte to obtain suitable viscosity and ionic conductivity, which in turn facilitates the transport of lithium ions. For example, the cyclic carbonate compound may include at least one of ethylene carbonate (EC), propylene carbonate (PC), and butylene carbonate (BC). For example, the linear carbonate compound may include at least one of ethyl methyl carbonate (EMC), diethyl carbonate (DEC), dimethyl carbonate (DMC), dipropyl carbonate (DPC), methyl propyl carbonate (MPC), and ethylene propyl carbonate (EPC).

In some embodiments, the non-aqueous solvent may further include a solvent other than the cyclic carbonate compound and the linear carbonate compound. For example, the non-aqueous solvent may further include at least one of carboxylate compound, sulfone compound, and ether compound. For example, the carboxylate compound may include at least one of methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), and gamma-butyrolactone (GBL). For example, the sulfone compound may include at least one of sulfolane (SF), methyl sulfonyl methane (MSM), ethyl methanesulfonate (EMS), and ethylsulfonylethane (ESE). For example, the ether compounds include at least one of tetrahydrofuran (THF), 2-methyltetrahydrofuran, 1,3-dioxolane (DOL), ethylene glycol monomethyl ether, dimethoxyethane (DME), tetraethylene glycol dimethyl ether, dimethoxymethane (DMM), and diglyme (DG). These solvents help the non-aqueous electrolyte to obtain suitable viscosity and/or ionic conductivity, which in turn facilitates the transport of lithium ions. In addition, these solvents also help the $DFOB^-$ in the non-aqueous electrolyte to become free ions to reduce association of anions and cations, thereby fully utilizing the effect of $DFOB^-$ on improving the capacity retention rate and kinetic performance of the secondary battery.

Optionally, in some embodiments, the non-aqueous solvent includes a cyclic carbonate compound, a linear carbonate compound, and an ether compound.

In the non-aqueous electrolyte, the mass percentage of the cyclic carbonate compound is E1, the mass percentage of the linear carbonate compound is E2, and the mass percentage of the ether compound is E3, all based on the total mass of the non-aqueous electrolyte. In some embodiments, E1 is 5% to 40%, and optionally, E1 is 10% to 30%; E2 is 40% to 85%, and optionally, E2 is 60% to 80%; and E3 is 0.1% to 40%, and optionally, E3 is 0.5% to 20%.

In this application, each composition (for example, the first cations, first anions, second anions, third anions, fourth anions, fifth anions, first additive, and second additive) and its percentage in the non-aqueous electrolyte can be determined in a method known in the art. For example, the gas chromatography-mass spectrometry (GC-MS), ion chromatography (IC), liquid chromatography (LC), nuclear magnetic resonance (NMR), and inductively coupled plasma-optical emission spectroscopy (ICP-OES) method may be used for determination.

It should be noted that for non-aqueous electrolyte test in this application, a fresh prepared non-aqueous electrolyte may be used directly, or a non-aqueous electrolyte may be obtained from a secondary battery. An example method for obtaining a non-aqueous electrolyte from a secondary battery includes the following steps: discharging the secondary battery to a discharge cut-off voltage (generally fully discharging the battery for safety), performing centrifugation, and using an appropriate amount of the centrifuged electrolyte as the non-aqueous electrolyte. The non-aqueous electrolyte may alternatively be obtained directly from an injection opening of the secondary battery.

Preparation Method

A second aspect of this application provides a preparation method of non-aqueous electrolyte, and with the preparation method of non-aqueous electrolyte according to the second aspect of this application, the non-aqueous electrolyte in the first aspect of this application can be obtained.

Specifically, the preparation method of non-aqueous electrolyte includes the following step: mixing a non-aqueous solvent, a lithium salt, a soluble Me salt, soluble difluorooxalate borate, and an optional additive to uniformity to obtain a non-aqueous electrolyte, where Me represents a metal element other than element lithium. The non-aqueous electrolyte contains the non-aqueous solvent and lithium ions, first cations, and first anions dissolved therein, where the first cation is a metal cation $Me^{n+}$ other than the lithium ion, n representing a chemical valence of the metal cation; the first anion is a difluorooxalate borate anion $DFOB^-$; mass concentration of the first cations in the non-aqueous electrolyte is D1 ppm, and mass concentration of the first anions in the non-aqueous electrolyte is D2 ppm, both based on total mass of the non-aqueous electrolyte; and the non-aqueous electrolyte satisfies that D1 is 0.5 to 870 and that D1/D2 is 0.02 to 2.

Optionally, the element Me represents at least one of transition metal element and fifth to seventh main group metal elements. Optionally, a difference between a standard reduction potential of $Me^{n+}$ (vs. standard hydrogen electrode potential) and a standard reduction potential of $Li^+$ (vs. standard hydrogen electrode potential: $-3.04$ V) is 1.0 V or more. More optionally, Me represents at least one of Ni, Co, Mn, Al, and Fe. Optionally, $Me^{n+}$ represents at least one of $Ni^{2+}$, $Co^{2+}$, $Mn^{2+}$, $Al^{3+}$, and $Fe^{2+}$.

The materials are not limited to a particular addition order. For example, they may be added simultaneously or in batches.

A compound containing $Me^{n+}$ and being soluble in the non-aqueous electrolyte may be used as the soluble Me salt. In some embodiments, optionally, the soluble Me salt includes at least one of $Me(DFOB)_n$, $Me(BF_4)_n$, $Me(ClO_4)_n$, $Me[N(SO_2CF_3)_2]_n$, $Me(NO_3)_n$, $Me(SO_4)_{n/2}$, $Me(PF_6)_n$, $Me[N(SO_2F)_2]_n$, $Me(BOB)_n$, $Me(AsF_6)_n$, $Me(CF_3SO_3)_n$, $Me(PO_2F_2)_n$, $Me(DODFP)_n$, and $Me(OTFP)_n$. More optionally, the soluble Me salt includes at least one of $Me(DFOB)_n$, $Me(BF_4)_n$, $Me(NO_3)_n$, and $Me(SO_4)_{n/2}$. This helps to regulate the mass concentrations of the metal cations and different anions in the non-aqueous electrolyte within the desired ranges.

In some embodiments, the soluble difluorooxalate borate includes at least one of $Me(DFOB)_n$ and LiDFOB. This helps to regulate the mass concentrations of the metal cations and the first anions in the non-aqueous electrolyte within the desired ranges.

In some embodiments, optionally, at least one of the soluble Me salt and the soluble difluorooxalate borate includes $Me(DFOB)_n$. This helps the secondary battery to better balance good cycling performance, safety performance, and kinetic performance.

In some embodiments, the non-aqueous solvent includes a cyclic carbonate compound and a linear carbonate compound. Optionally, the non-aqueous solvent may further include a solvent other than the cyclic carbonate compound and the linear carbonate compound. For example, the non-aqueous solvent may further include at least one of carboxylate compound, sulfone compound, and ether compound. More optionally, the non-aqueous solvent includes a cyclic carbonate compound, a linear carbonate compound, and an ether compound. The ether compound helps to increase the degree of dissociation of the soluble Me salt and soluble difluorooxalate borate in the non-aqueous electrolyte, thereby helping to regulate the mass concentrations of the metal cations and different anions in the non-aqueous electrolyte within the desired ranges.

In some embodiments, the lithium salt includes a first lithium salt, and the first lithium salt includes lithium hexafluorophosphate ($LiPF_6$), lithium bis(fluorosulfonyl) imide (LiFSI), or a combination thereof. The first lithium salt is used as a primary lithium salt and may have a mass percentage of 8% to 20%, optionally 9% to 18%, and more optionally 9% to 15% in the non-aqueous electrolyte based on the total mass of the non-aqueous electrolyte.

In the non-aqueous electrolyte in this application, lithium hexafluorophosphate and/or lithium bis(fluorosulfonyl)imide is used as a primary lithium salt. Lithium hexafluorophosphate has high ionic conductivity and is less likely to corrode a positive electrode current collector, and can improve the overall ionic conductivity and thermal stability of the non-aqueous electrolyte when used as the primary lithium salt. The chemical formula of lithium bis(fluorosulfonyl)imide is $F_2NO_4S_2$. Li, in which the N atom is bonded to two electron-withdrawing sulfonyl groups. This enables the charge on the N atom to be fully delocalized, to allow for low lattice energy and easy dissociation for lithium bis(fluorosulfonyl)imide, thus improving the ionic conductivity of the non-aqueous electrolyte and reducing the viscosity of the non-aqueous electrolyte. In addition, lithium bis(fluorosulfonyl)imide also has good high-temperature resistance and is not prone to hydrolysis, and therefore can form a thinner but more thermally stable interface film with lower impedance on the surface of the negative electrode active material, thus reducing side reactions between the negative electrode active material and the non-aqueous electrolyte.

In some embodiments, the first lithium salt includes lithium hexafluorophosphate ($LiPF_6$).

In some embodiments, the first lithium salt includes lithium bis(fluorosulfonyl)imide (LiFSI).

In some embodiments, the first lithium salt includes both lithium hexafluorophosphate ($LiPF_6$) and lithium bis(fluorosulfonyl)imide (LiFSI). Optionally, a mass ratio of the lithium hexafluorophosphate to the lithium bis(fluorosulfonyl)imide is 0.2 to 3 and more optionally 0.3 to 2, 0.4 to 1.8, or 0.5 to 1.5. In this way, the non-aqueous electrolyte is not prone to hydrolysis and can have higher thermal stability and contribute to the formation of an interface film with a lower impedance.

In some embodiments, optionally, the lithium salt may further include a second lithium salt, and the second lithium salt includes at least one of lithium bis(oxalato)borate (LiBOB), lithium tetrafluoroborate ($LiBF_4$), lithium bis(trifluoromethanesulfonyl)imide (LiTFSI), lithium perchlorate ($LiClO_4$), lithium hexafluoroarsenate ($LiAsF_6$), lithium trifluoromethanesulfonate (LiTFS), lithium difluorophosphate ($LiPO_2F_2$), lithium difluorobis(oxalato)phosphate (LiDODFP), and lithium tetrafluoro(oxalato)phosphate (LiOTFP). As an auxiliary lithium salt, the second lithium salt can further improve the interface performance of a positive and/or negative electrode or the ionic conductivity or thermal stability of the non-aqueous electrolyte. Optionally, mass percentage of the second lithium salt in the non-aqueous electrolyte is 2% or less and more optionally 0.5% or less based on the total mass of the non-aqueous electrolyte.

In some embodiments, optionally, the second lithium salt includes lithium difluorophosphate ($LiPO_2F_2$), lithium tetrafluoro(oxalato)phosphate (LiOTFP), or a combination thereof, and more optionally, the second lithium salt includes lithium difluorophosphate ($LiPO_2F_2$). Lithium difluorophosphate has high electrochemical stability and therefore can increase the ionic conductivity of the non-aqueous electrolyte, improve the property of a positive electrode interface film and/or negative electrode interface film, and help to construct a stable and low-impedance positive electrode interface film and/or negative electrode interface film, thereby effectively reducing decomposition of the non-aqueous electrolyte and further improving the kinetic performance and safety performance of the secondary battery. Optionally, a mass ratio of the lithium difluorophosphate and the first lithium salt is 0.01 to 0.15 and more optionally 0.01 to 0.1.

In some embodiments, the additive includes at least one of a first additive and a second additive, where the first additive is fluoroethylene carbonate (FEC), and the second additive includes at least one of vinylidene carbonate (VC), lithium oxalate, vinyl sulfate (DTD), 1,3-propane sultone (PS).

Adjusting the type and amount of raw materials in the non-aqueous electrolyte helps to adjust the degree of dissociation of the lithium salt, soluble Me salt, and soluble difluorooxalate borate in the non-aqueous electrolyte and helps to obtain a non-aqueous electrolyte having required mass concentrations of the metal cations and anions (for example, the first anions, second anions, third anions, fourth anions, and fifth anions). The resulting non-aqueous electrolyte has the same composition type and specific composition proportion as the non-aqueous electrolyte in the first aspect of the embodiments of this application.

Secondary Battery

A third aspect of this application provides a secondary battery. The secondary battery includes an electrode assembly and a non-aqueous electrolyte. The non-aqueous electrolyte is the non-aqueous electrolyte according to the first aspect of this application or a non-aqueous electrolyte obtained by using the method according to the second aspect of this application. In this way, the secondary battery can have good cycling performance, safety performance, and kinetic performance. The secondary battery in this application may be a lithium secondary battery, and in particular, a lithium-ion secondary battery.

The electrode assembly includes a positive electrode plate, a negative electrode plate, and a separator. The separator is disposed between the positive electrode plate and the negative electrode plate, mainly to prevent short circuit between the positive electrode and the negative electrode and allow lithium ions to pass through.

[Positive Electrode Plate]

In some embodiments, the positive electrode plate includes a positive electrode current collector and a positive electrode film layer disposed on at least one surface of the positive electrode current collector and including a positive electrode active material. For example, the positive electrode current collector has two opposite surfaces in its thickness direction, and the positive electrode film layer is provided on either or both of the two opposite surfaces of the positive electrode current collector.

The positive electrode film layer includes the positive electrode active material, where the positive electrode active material may be a well-known positive electrode active material for secondary battery in the art. For example, the positive electrode active material may include at least one of lithium transition metal oxide, olivine-structured lithium-containing phosphate, and their respective modified compounds. Examples of the lithium transition metal oxide may include at least one of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and respective modified compounds thereof. Examples of the olivine-structured lithium-containing phosphate may include at least one of lithium iron phosphate, a composite material of lithium iron phosphate and carbon, lithium manganese phosphate, a composite material of lithium manganese phosphate and carbon, lithium manganese iron phosphate, a composite material of lithium manganese iron phosphate and carbon, and respective modified compounds thereof. One of these positive electrode active materials may be used alone, or two or more of them may be used in combination.

In some embodiments, optionally, the positive electrode active material includes a layered material having a molecular formula of $Li_aNi_bCo_cMn_dAl_eM_fO_gA_h$, M represents transition metal site doping cation, A represents oxygen site doping anion, $0.8 \leq a \leq 1.2$, $0 \leq b \leq 1$, $0 \leq c \leq 1$, $0 \leq d \leq 1$, $0 \leq e \leq 1$, $0 \leq f \leq 0.2$, $0 \leq g \leq 2$, $0 \leq h \leq 2$, $b+c+d+e+f+f=1$, and $g+h=2$.

The layered material having a molecular formula of $Li_aNi_bCo_cMn_dAl_eM_fO_gA_h$ is optionally modified through cation M doping, anion A doping, or both cation M doping and anion A doping. The doped layered material obtained has a more stable crystal structure and can further enhance the electrochemical performance of the secondary battery, such as cycling performance and kinetic performance.

In some embodiments, M is selected from at least one of Si, Ti, Mo, V, Ge, Se, Zr, Nb, Ru, Pd, Sb, Ce, Te, and W.

In some embodiments, A is selected from at least one of F, N, P, and S. Optionally, A is selected from F. After modified through F doping, $Li_aNi_bCo_cMn_dAl_eM_fO_gA_h$ has a more stable crystal structure, thus enabling the secondary battery to have better cycling performance and kinetic performance.

The values of a, b, c, d, e, f, g, and h satisfy the following conditions so that $Li_aNi_bCo_cMn_dAl_eM_fO_gA_h$ maintains electrical neutrality.

In some embodiments, $0 < b < 0.98$. Optionally, $0.50 \leq b < 0.98$, $0.55 \leq b < 0.98$, $0.60 \leq b < 0.98$, $0.65 \leq b < 0.98$, $0.70 \leq b < 0.98$, $0.75 \leq b < 0.98$, or $0.80 \leq b < 0.98$.

In some embodiments, $c=0$.

In some embodiments, $0 < c \leq 0.20$. Optionally, $0 < c$ 0.15, $0 < c \leq 0.10$, $0 < c \leq 0.09$, $0 < c \leq 0.08$, $0 < c \leq 0.07$, $0 < c \leq 0.06$, $0 < c \leq 0.05$, $0 < c \leq 0.04$, $0 < c \leq 0.03$, $0 < c \leq 0.02$, or $0 < c \leq 0.01$. Cobalt is scarce in the Earth's crust difficult to mine, and expensive. Therefore, low cobalt or no cobalt has become an inevitable development trend for positive electrode active materials. However, cobalt contributes greatly to the lithium ion diffusion rate of positive electrode active materials, and low cobalt or no cobalt reduces the lithium ion diffusion rate of positive electrode active materials and affects the cycling performance of secondary batteries. Researchers have been working to increase the lithium ion diffusion rate of positive electrode cathode active materials having low cobalt or no cobalt, but there is no good solution yet.

The inventors of this application have surprisingly found during research that $DFOB^-$ in a non-aqueous electrolyte can form a low impedance protective film on the surface of the positive electrode active material, and that the B atom in $DFOB^-$ can easily bond with the O atom in the positive electrode active material to reduce the charge transfer resistance of the positive electrode active material, thus reducing the diffusion resistance of lithium ions in the bulk phase of the positive electrode active material. Therefore, when the non-aqueous electrolyte contains a proper amount of $DFOB^-$, the positive electrode active material having low cobalt or no cobalt can have a significantly improved lithium ion diffusion rate, the surface can be supplemented with lithium ions within the bulk phase of the positive electrode active material having low cobalt or no cobalt in time, avoiding over-deintercalation of lithium on the surface of the positive electrode active material having low cobalt or no cobalt, thereby stabilizing the crystal structure of the positive electrode active material having low cobalt or no cobalt. The crystal structure of the positive electrode active material having low cobalt or no cobalt being more stable can greatly reduce the probability that over-deintercalation of lithium on the surface of the positive electrode active material having low cobalt or no cobalt causes unstable structural, chemical, or electrochemical properties of the positive electrode active material, for example, irreversible deformation and an increase in lattice defects of the positive electrode active material.

In some embodiments, $d=0$ and $0 < e < 0.50$. Optionally, $d=0$ and $0 < e \leq 0.45$, $d=0$ and $0 < e \leq 0.40$, $d=0$ and $0 < e \leq 0.35$, $d=0$ and $0 < e \leq 0.30$, $d=0$ and $0 < e \leq 0.25$, $d=0$ and $0 < e \leq 0.20$, $d=0$ and $0 < e \leq 0.15$, or $d=0$ and $0 < e \leq 0.10$.

In some embodiments, $e=0$ and $0 < d < 0.50$. Optionally, $e=0$ and $0 < d \leq 0.45$, $e=0$ and $0 < d \leq 0.40$, $e=0$ and $0 < d \leq 0.35$, $e=0$ and $0 < d \leq 0.30$, $e=0$ and $0 < d \leq 0.25$, $e=0$ and $0 < d \leq 0.20$, $e=0$ and $0 < d \leq 0.15$, or $e=0$ and $0 < d \leq 0.10$.

In some embodiments, $0 < d \leq 0.50$ and $0 < e \leq 0.50$. Optionally, $0 < d \leq 0.30$ and $0 < e \leq 0.10$.

In some embodiments, $g=2$ and $h=0$.

In some embodiments, $g=0$ and $h=2$.

In some embodiments, $0 < g < 2$, $0 < h < 2$, and $g+h=2$.

For example, the layered material having a molecular formula of $Li_aNi_bCo_cMn_dAl_eM_fO_gA_h$ includes but is not limited to at least one of $LiNi_{0.8}Co_{0.1}Mn_{0.1}O_2$, $LiNi_{0.6}Co_{0.2}Mn_{0.2}O_2$, $LiNi_{0.5}Co_{0.2}Mn_{0.3}O_2$, $LiNi_{0.8}Co_{0.05}Mn_{0.15}O_2$, $LiNi_{0.7}Mn_{0.3}O_2$, $LiNi_{0.69}Co_{0.01}Mn_{0.3}O_2$, $LiNi_{0.65}Co_{0.02}Mn_{0.3}O_2$, $LiNi_{0.65}Co_{0.05}Mn_{0.3}O_2$, $LiNi_{0.63}Co_{0.07}Mn_{0.3}O_2$, and $LiNi_{0.61}Co_{0.09}Mn_{0.3}O_2$.

$Li_aNi_bCo_cMn_dAl_eM_fO_gA_h$ may be prepared in a conventional method in the art. An example preparation method is as follows: sintering a lithium source, a nickel source, a cobalt source, a manganese source, an aluminum source, an element M precursor, and an element A precursor after mixing them, to obtain $Li_aNi_bCo_cMn_dAl_eM_fO_gA_h$. A sintering atmosphere may be an oxygen-containing atmosphere, for example, an air atmosphere or an oxygen atmosphere. An $O_2$ concentration of a sintering atmosphere is, for example, 70% to 100%. A sintering temperature and sintering time may be adjusted depending on an actual situation.

For example, the lithium source includes but is not limited to at least one of lithium oxide ($Li_2O$), lithium phosphate ($Li_3PO_4$), lithium dihydrogen phosphate ($LiH_2PO_4$), lithium acetate ($CH_3COOLi$), lithium hydroxide ($LiOH$), lithium carbonate ($Li_2CO_3$), and lithium nitrate ($LiNO_3$). For example, the nickel source includes but is not limited to at least one of nickel sulfate, nickel nitrate, nickel chloride, nickel oxalate, and nickel acetate. For example, the cobalt source includes but is not limited to at least one of cobalt sulfate, cobalt nitrate, cobalt chloride, cobalt oxalate, and cobalt acetate. For example, the manganese source includes but is not limited to at least one of manganese sulfate, manganese nitrate, manganese chloride, manganese oxalate, and manganese acetate. For example, the aluminum source includes but is not limited to at least one of aluminum sulfate, aluminum nitrate, aluminum chloride, aluminum oxalate, and aluminum acetate. For example, the element M precursor includes but is not limited to at least one of oxide, nitric acid compound, carbonic acid compound, hydroxide compound, and acetic acid compound of element M. For example, the element A precursor includes but is not limited to at least one of ammonium fluoride, lithium fluoride, hydrogen fluoride, ammonium chloride, lithium chloride, hydrogen chloride, ammonium nitrate, ammonium nitrite, ammonium carbonate, ammonium bicarbonate, ammonium phosphate, phosphoric acid, ammonium sulfate, ammonium bisulfate, ammonium bisulfite, ammonium sulfite, ammonium hydrogen sulfide, hydrogen sulfide, lithium sulfide, ammonium sulfide, and elemental sulfur.

In some embodiments, based on the total mass of the positive electrode film layer, mass percentage of the layered material having a molecular formula of $Li_aNi_bCo_cMn_d$ $Al_eM_fO_gA_h$ is 80% to 99%. For example, the mass percentage of the layered material having a molecular formula of $Li_aNi_bCo_cMn_dAl_eM_fO_gA_h$ may be 80%, 81%, 82%, 83%, 84%, 85%, 86%, 87%, 88%, 89%, 90%, 91%, 92%, 93%, 94%, 95%, 96%, 97%, 98%, 99%, or in a range defined by any of these values. Optionally, the mass percentage of the layered material having a molecular formula of $Li_aNi_b$-$Co_cMn_dAl_eM_fO_gA_h$ may be 85% to 99%, 90% to 99%, 95% to 99%, 80% to 98%, 85% to 98%, 90% to 98%, 95% to 98%, 80% to 97%, 85% to 97%, 90% to 97%, or 95% to 97%.

In some embodiments, the positive electrode film layer further optionally includes a positive electrode conductive agent. The positive electrode conductive agent is not limited to a particular type in this application. For example, the positive electrode conductive agent includes at least one of superconducting carbon, conductive graphite, acetylene black, carbon black, Ketjen black, carbon dots, carbon nanotubes, graphene, and carbon nanofiber. In some embodiments, mass percentage of the positive electrode conductive agent is 5% or less based on the total mass of the positive electrode film layer.

In some embodiments, the positive electrode film layer further optionally includes a positive electrode binder. The positive electrode binder is not limited to a particular type in this application. For example, the positive electrode binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin. In some embodiments, mass percentage of the positive electrode binder is 5% or less based on the total mass of the positive electrode film layer.

In some embodiments, the positive electrode current collector may be a metal foil current collector or a composite current collector. For example, the metal foil may be an aluminum foil. The composite current collector may include a polymer material matrix and a metal material layer formed on at least one surface of the polymer material matrix. For example, the metal material may include at least one of aluminum, aluminum alloy, nickel, nickel alloy, titanium, titanium alloy, silver, and silver alloy. For example, the polymer material matrix may include polypropylene (PP), polyethylene terephthalate (PET), polybutylene terephthalate (PBT), polystyrene (PS), polyethylene (PE), or the like.

The positive electrode film layer is usually formed by applying a positive electrode slurry onto the positive electrode current collector, followed by drying and cold pressing. The positive electrode slurry is typically formed by dispersing the positive electrode active material, the optional conductive agent, the optional binder, and any other components into a solvent and stirring them to uniformity. The solvent may be but is not limited to N-methylpyrrolidone (NMP).

[Negative Electrode Plate]

In some embodiments, the negative electrode plate includes a negative electrode current collector and a negative electrode film layer disposed on at least one surface of the negative electrode current collector and including a negative electrode active material. For example, the negative electrode current collector has two opposite surfaces in its thickness direction, and the negative electrode film layer is provided on either or both of the two opposite surfaces of the negative electrode current collector.

The negative electrode active material may be a negative electrode active material for secondary battery well-known in the art. For example, the negative electrode active material includes but is not limited to at least one of natural graphite, artificial graphite, soft carbon, hard carbon, a silicon-based material, a tin-based material, and lithium titanate. The silicon-based material may include at least one of elemental silicon, silicon-oxygen compound, silicon-carbon compound, silicon-nitrogen compound, and silicon alloy. The tin-based material may include at least one of elemental tin, tin oxide, and tin alloy material. This application is not limited to these materials, and other conventional commonly known materials that can be used as a negative electrode active material for secondary battery may also be used. One of these negative electrode active materials may be used alone, or two or more of them may be used in combination.

In some embodiments, the negative electrode film layer further optionally includes a negative electrode conductive agent. The negative electrode conductive agent is not limited to a particular type in this application. For example, the negative electrode conductive agent may include at least one of superconducting carbon, conductive graphite, acetylene black, carbon black, Ketjen black, carbon dots, carbon nanotubes, graphene, and carbon nanofiber. In some embodiments, mass percentage of the negative electrode conductive agent is 5% or less based on the total mass of the negative electrode film layer.

In some embodiments, the negative electrode film layer further optionally includes a negative electrode binder. The negative electrode binder is not limited to a particular type in this application. For example, the negative electrode binder may include at least one styrene-butadiene rubber (SBR), water-soluble unsaturated resin SR-1B, waterborne acrylic resin (for example, polyacrylic acid PAA, polymethylacrylic acid PMAA, and polyacrylic acid sodium PAAS), polyacrylamide (PAM), polyvinyl alcohol (PVA), sodium alginate (SA), and carboxymethyl chitosan (CMCS). In some embodiments, mass percentage of the negative electrode binder is 5% or less based on the total mass of the negative electrode film layer.

In some embodiments, the negative electrode film layer further optionally includes another additive. For example, the another additive may include a thickener, for example, sodium carboxymethyl cellulose (CMC-Na) or PTC thermistor material. In some embodiments, mass percentage of the another additive is 2% or less based on the total mass of the negative electrode film layer.

In some embodiments, the negative electrode current collector may be a metal foil current collector or a composite current collector. For example, the metal foil may be a copper foil. The composite current collector may include a polymer material matrix and a metal material layer formed on at least one surface of the polymer material matrix. For example, the metal material may be selected from at least one of copper, copper alloy, nickel, nickel alloy, titanium, titanium alloy, silver, and silver alloy. For example, the polymer material matrix may include polypropylene (PP), polyethylene terephthalate (PET), polybutylene terephthalate (PBT), polystyrene (PS), polyethylene (PE), or the like.

The negative electrode film layer is usually formed by applying a negative electrode slurry onto the negative electrode current collector, followed by drying and cold pressing. The negative electrode slurry is usually formed by dispersing the negative electrode active material, the optional conductive agent, the optional binder, and the optional another additive in a solvent and stirring them to uniformity. The solvent may be but is not limited to N-methylpyrrolidone (NMP) or deionized water.

[Separator]

The separator is disposed between the positive electrode plate and the negative electrode plate, mainly to prevent short circuit between the positive electrode and the negative electrode and allow lithium ions to pass through. The separator is not limited to a particular type in this application, and may be any well-known porous separator with good chemical stability and mechanical stability.

In some embodiments, a material of the separator may include at least one of glass fiber, non-woven fabric, polyethylene, polypropylene, and polyvinylidene fluoride. The separator may be a single-layer thin film or a multi-layer composite thin film. When the separator is a multi-layer composite thin film, all layers may be made of the same or different materials.

In some embodiments, the positive electrode plate, separator, and the negative electrode plate may be made into an electrode assembly through winding or lamination.

In some embodiments, the secondary battery may include an outer package. The outer package may be used for packaging the electrode assembly and the non-aqueous electrolyte.

In some embodiments, the outer package of the secondary battery may be a hard shell, for example, a hard plastic shell, an aluminum shell, or a steel shell. The outer package of the secondary battery may alternatively be a soft pack, for example, a soft pouch. Material of the soft pack may be plastic, for example, at least one of polypropylene (PP), polybutylene terephthalate (PBT), polybutylene succinate (PBS), or the like.

This application does not impose any special limitations on a shape of the secondary battery, and the secondary battery may be cylindrical, rectangular, or of any other shapes. FIG. 1 shows a rectangular secondary battery 5 as an example.

Figure 2:
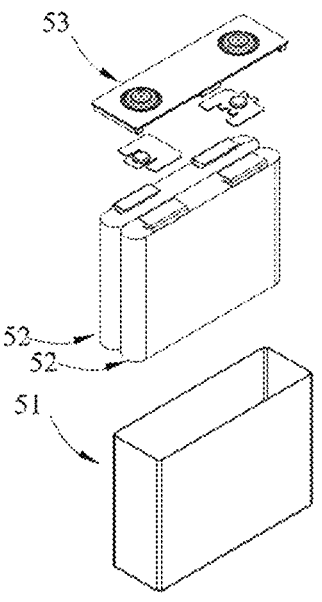
FIG. 2 is a schematic exploded view of the embodiment of the secondary battery in FIG. 1.

In some embodiments, as shown in FIG. 2, the outer package may include a housing 51 and a cover plate 53. The housing 51 may include a bottom plate and a side plate connected to the bottom plate, where the bottom plate and the side plate enclose an accommodating cavity. The housing 51 has an opening in communication with the accommodating cavity, and the cover plate 53 is configured to cover the opening so as to close the accommodating cavity. The positive electrode plate, the negative electrode plate, and the separator may be made into an electrode assembly 52 through winding or lamination. The electrode assembly 52 is packaged into the accommodating cavity. The non-aqueous electrolyte infiltrates into the electrode assembly 52. The secondary battery 5 may include one or more electrode assemblies 52 whose quantity is adjustable as required.

The preparation method of secondary battery in this application is well known. In some embodiments, the positive electrode plate, the separator, the negative electrode plate, and the non-aqueous electrolyte may be assembled to form a secondary battery. For example, the positive electrode plate, separator, and negative electrode plate may be made into an electrode assembly through winding or lamination; and the electrode assembly is put in an outer package, followed by drying, and the non-aqueous electrolyte is injected, followed by vacuum sealing, standing, formation, shaping, and other processes, to obtain a secondary battery.

In some embodiments of this application, such secondary batteries in this application may be combined to assemble a battery module. The battery module may include a plurality of secondary batteries whose quantity may be adjusted according to the use case and capacity of the battery module.

Figure 3:
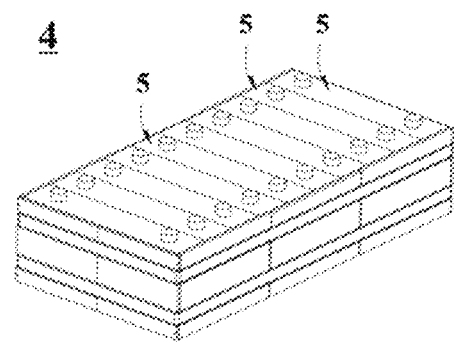
FIG. 3 is a schematic diagram of an embodiment of a battery module in this application.

FIG. 3 is a schematic diagram of a battery module 4 as an example. As shown in FIG. 3, in the battery module 4, a plurality of secondary batteries 5 may be sequentially arranged in a length direction of the battery module 4. Certainly, the batteries may alternatively be arranged in any other manners. Further, the plurality of secondary batteries 5 may be fastened by using fasteners.

Optionally, the battery module 4 may further include a housing with accommodating space, and the plurality of secondary batteries 5 are accommodated in the accommodating space.

In some embodiments, the battery modules may be further assembled into a battery pack, and a quantity of battery modules included in the battery pack may be adjusted based on use and capacity of the battery pack.

Figure 4:
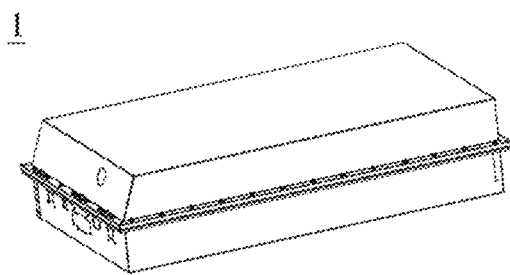
FIG. 4 is a schematic diagram of an embodiment of a battery pack in this application.
Figure 5:
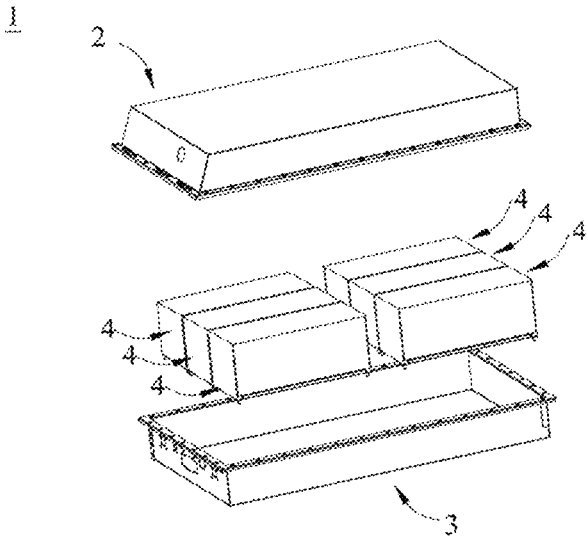
FIG. 5 is a schematic exploded view of the embodiment of the battery pack in FIG. 4.

FIG. 4 and FIG. 5 are schematic diagrams of a battery pack 1 as an example. As shown in FIG. 4 and FIG. 5, the battery pack 1 may include a battery box and a plurality of battery modules 4 arranged in the battery box. The battery box includes an upper box body 2 and a lower box body 3. The upper box body 2 is configured to cover the lower box body 3 to form an enclosed space for accommodating the battery modules 4. The plurality of battery modules 4 may be arranged in the battery box in any manner.

Electric Apparatus

A fourth aspect of this application further provides an electric apparatus. The electric apparatus includes at least one of the secondary battery, the battery module, and the battery pack according to this application. The secondary battery, the battery module, or the battery pack may be used as a power source for the electric apparatus, or an energy storage unit of the electric apparatus. The electric apparatus may be but is not limited to a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

The secondary battery, the battery module, or the battery pack may be selected for the electric apparatus based on requirements for using the apparatus.

Figure 6:
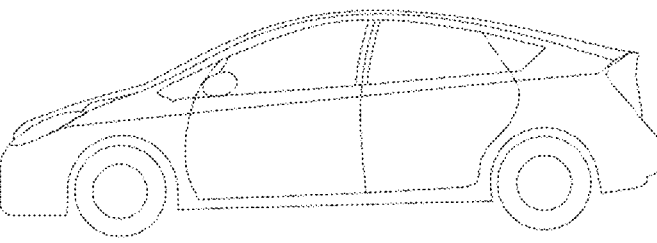
FIG. 6 is a schematic diagram of an embodiment of an electric apparatus using the secondary battery in this application as a power source.

FIG. 6 is a schematic diagram of an electric apparatus as an example. This electric apparatus is a battery electric vehicle, a hybrid electric vehicle, a plug-in hybrid electric vehicle, or the like. To satisfy requirements of the electric apparatus for high power and high energy density, a battery pack or a battery module may be used.

In another example, the electric apparatus may be a mobile phone, a tablet computer, a notebook computer, or the like. The electric apparatus is usually required to be light and thin, and a secondary battery may be used as a power source.

Examples

Content disclosed in this application is described in detail in the following examples. These examples are only for illustrative purposes because various modifications and changes made without departing from the scope of the content disclosed in this application are apparent to persons skilled in the art. Unless otherwise stated, all parts, percentages, and ratios reported in the following examples are based on mass, all reagents used in the examples are commercially available or synthesized in a conventional manner, and can be used directly without further treatment, and all instruments used in the examples are commercially available.

In Examples 1 to 36 and Comparative Examples 1 to 4, secondary batteries were all prepared according to the following method.

Preparation of Positive Electrode Plate

A positive electrode active material $LiNi_{0.65}Co_{0.05}Mn_{0.3}O_2$, a conductive agent Super P, and a binder polyvinylidene fluoride (PVDF) were thoroughly mixed and stirred in a proper amount of solvent (NMP) at a weight ratio of 97.5:1.4:1.1 to form a uniform positive electrode slurry. The positive electrode slurry was evenly applied onto the surface of a positive electrode current collector aluminum foil, followed by drying and cold pressing, to obtain a positive electrode plate.

Preparation of Negative Electrode Plate

A negative electrode active material graphite, a binder styrene-butadiene rubber (SBR), a thickener sodium carboxymethyl cellulose (CMC-Na), and a conductive agent carbon black (Super P) were thoroughly mixed and stirred in a proper amount of solvent deionized water at a mass ratio of 96.2:1.8:1.2:0.8 to form a uniform negative electrode slurry. The negative electrode slurry was evenly applied onto the surface of a negative electrode current collector copper foil, followed by drying and cold pressing, to obtain a negative electrode plate.

Separator

A porous polyethylene (PE) film was used as a separator.

Preparation of Non-Aqueous Electrolyte

A cyclic carbonate compound and a linear carbonate compound according to the composition shown in Table 1 were mixed to uniformity to obtain an organic solvent. Then, a lithium salt, additives, a soluble Me salt, and soluble difluorooxalate borate were added to the organic solvent according to the composition shown in Table 1 and mixed to uniformity to obtain a non-aqueous electrolyte. In Table 1, the amount of each composition is based on the total mass of the non-aqueous electrolyte.

Preparation of Secondary Battery

The positive electrode plate, the separator, and the negative electrode plate were stacked in order and wound, to obtain an electrode assembly. The electrode assembly was put into an outer package, and the foregoing prepared non-aqueous electrolyte was added, followed by sealing, standing, formation, aging, and other processes, to obtain a secondary battery.

Tests (1) Test for Non-Aqueous Electrolyte Compositions and Amounts Thereof

Metal cation test: After the secondary battery prepared above was fully discharged, 10 mL free electrolyte was taken out from the injection opening. An inductively coupled plasma optical emission spectrometry instrument of model ICAP-7400 by Thermo Fisher Scientific was used for the test. The mass concentration D1 ppm of the first cations in the non-aqueous electrolyte was calculated based on the test results.

Anion test: After the secondary battery prepared above was fully discharged, 1.5 mL free electrolyte was taken out from the injection opening for later use. The electrolyte was tested for the mass concentration D2 ppm of the first anions, the mass concentration D3 ppm of the second anions, and the mass concentration D4 ppm of the third anion by using the nuclear magnetic resonance spectrometry method.

The specific steps of the test were as follows: 500 μl deuterated reagent was added to a nuclear magnetic resonance tube in a nitrogen-filled glove box, 100 μl non-aqueous electrolyte was taken and added to the nuclear magnetic resonance tube, and the nuclear magnetic resonance tube was shaken to dissolve the non-aqueous electrolyte into the deuterated reagent. The test was performed using an X-Pulse benchtop nuclear magnetic resonance spectrometer by Oxford Instruments. Because the non-aqueous electrolyte is very sensitive to water, the nuclear magnetic resonance test and sample preparation were both performed in the nitrogen atmosphere (with $H_2O$ amount less than 0.1 ppm and $O_2$ amount less than 0.1 ppm), and the instruments associated with the test were washed with pure water in advance and dried in a vacuum environment at 60° C. for 48 hours or more.

The deuterated reagent was prepared in the following step: Deuterated dimethyl sulfoxide (DMSO-d6), deuterated acetonitrile, and trifluoromethylbenzene were dried with 4 A molecular sieves at 25° C. or more for 3 days or more to ensure that the water contents of all reagents were less than 3 ppm. An 831 KF coulometer by Metrohm of Switzerland was used as a moisture measuring instrument. Thereafter, from the nitrogen-filled glove box, 10 mL dried DMSO-d6 and 300 μl dried internal standard substance trifluoromethylbenzene were taken and mixed to uniformity to obtain a first solution, 10 mL dried deuterated acetonitrile and 300 μl dried internal standard substance trifluoromethylbenzene were taken and mixed to uniformity to obtain a second solution, and the first solution and the second solution were mixed to uniformity to obtain a deuterated reagent.

(2) Room-Temperature Cycling Performance Test for Secondary Battery

At 25° C., the secondary battery was charged to 4.3 V at a constant current of 1C and charged to a current of 0.05C at a constant voltage. At this point, the secondary battery was fully charged, and a charge capacity at this point was recorded as a charge capacity of the first cycle. The secondary battery was left standing for 5 min and discharged to 2.8 V at a constant current of 1C. This was a charge and discharge cycle, and a discharge capacity at this moment was recorded as a discharge capacity of the first cycle. The secondary battery was subjected to the charge and discharge cycling test according to the foregoing method, and a discharge capacity of each cycle was recorded. Capacity retention rate (%) of secondary battery of 600th cycle at 25° C.=discharging capacity of 600th cycle/discharging capacity of first cycle×100%

(3) High-Temperature Cycling Performance Test for Secondary Battery

At 45° C., the secondary battery was charged to 4.3 V at a constant current of 1C and charged to a current of 0.05C at a constant voltage. At this point, the secondary battery was fully charged, and a charge capacity at this point was recorded as a charge capacity of the first cycle. The secondary battery was left standing for 5 min and discharged to 2.8 V at a constant current of 1C. This was a charge and discharge cycle, and a discharge capacity at this moment was recorded as a discharge capacity of the first cycle. The secondary battery was subjected to the charge and discharge cycling test according to the foregoing method, and a discharge capacity of each cycle was recorded. Capacity retention rate (%) of secondary battery of 600th cycle at 45° C.=discharging capacity of 600th cycle/discharging capacity of first cycle×100%

(4) Initial Direct Current Internal Resistance Test for Secondary Battery

At 25° C., the secondary battery was charged to 4.3 V at a constant current of 1C, and charged to a current of 0.05C at a constant voltage. At this point, the secondary battery was fully charged. The secondary battery was discharged at a constant current of 0.5C and adjusted to 50% SOC. At this point, the voltage of the secondary battery was recorded as $U_1$. The secondary battery was discharged for 30 seconds at a constant current $I_1$ of 4C, and sampling was carried out every 0.1 seconds. The voltage at the end of discharge was recorded as $U_2$. The initial discharge direct current internal resistance of the secondary battery at 50% SOC was used to represent the initial direct current internal resistance of the secondary battery. The initial direct current internal resistance (mΩ) of the secondary battery was $(U_1-U_2)/I_1$.

(5) High-Temperature Storage Performance Test for Secondary Battery

At 60° C., the secondary battery was charged to 4.3 V at a constant current of 1C, and charged to a current of 0.05C at a constant voltage. At this point, the volume of the secondary battery was tested by using the drainage method and recorded as $V_0$. The secondary battery was placed in a 60° C. thermostat and stored therein for 30 days. At this point, the volume of the secondary battery was tested by using the drainage method and recorded as $V_1$. Volume swelling rate (%) of secondary battery after 30 days of storage at 60° C.=$(V_1-V_0)/V_0\times100\%$ Table 2 shows the test results of Examples 1 to 36 and Comparative Examples 1 to 4.

TABLE 1

| No. | Cyclic carbonate compound | | Linear carbonate compound | | Lithium salt | | Additive | |
|---|---|---|---|---|---|---|---|---|
| | Name | Percentage | Name | Percentage | Name | Percentage | Name | Percentage |
| Example 1 | EC | 20% | DMC | 65.400% | LiPF$_6$ | 12.50% | FEC | 2.0% |
| Example 2 | EC | 20% | DMC | 65.39% | LiPF$_6$ | 12.50% | FEC | 2.0% |
| Example 3 | EC | 20% | DMC | 65.38% | LiPF$_6$ | 12.50% | FEC | 2.0% |
| Example 4 | EC | 20% | DMC | 65.37% | LiPF$_6$ | 12.50% | FEC | 2.0% |
| Example 5 | EC | 20% | DMC | 65.36% | LiPF$_6$ | 12.50% | FEC | 2.0% |
| Example 6 | EC | 20% | DMC | 65.36% | LiPF$_6$ | 12.50% | FEC | 2.0% |
| Example 7 | EC | 20% | DMC | 65.35% | LiPF$_6$ | 12.50% | FEC | 2.0% |
| Example 8 | EC | 20% | DMC | 65.34% | LiPF$_6$ | 12.50% | FEC | 2.0% |
| Example 9 | EC | 20% | DMC | 65.29% | LiPF$_6$ | 12.50% | FEC | 2.0% |
| Example 10 | EC | 20% | DMC | 65.25% | LiPF$_6$ | 12.50% | FEC | 2.0% |
| Example 11 | EC | 20% | DMC | 65.19% | LiPF$_6$ | 12.50% | FEC | 2.0% |
| Example 12 | EC | 20% | DMC | 65.35% | LiPF$_6$ | 12.50% | FEC | 2.0% |
| Example 13 | EC | 20% | DMC | 65.34% | LiPF$_6$ | 12.50% | FEC | 2.0% |
| Example 14 | EC | 20% | DMC | 65.33% | LiPF$_6$ | 12.50% | FEC | 2.0% |
| Example 15 | EC | 20% | DMC | 65.31% | LiPF$_6$ | 12.50% | FEC | 2.0% |
| Example 16 | EC | 20% | DMC | 65.26% | LiPF$_6$ | 12.50% | FEC | 2.0% |
| Example 17 | EC | 20% | DMC | 65.11% | LiPF$_6$ | 12.50% | FEC | 2.0% |
| Example 18 | EC | 20% | DMC | 65.40% | LiPF$_6$ | 12.50% | FEC | 2.0% |
| Example 19 | EC | 20% | DMC | 65.37% | LiPF$_6$ | 12.50% | FEC | 2.0% |
| Example 20 | EC | 20% | DMC | 65.35% | LiPF$_6$ | 12.50% | FEC | 2.0% |
| Example 21 | EC | 20% | DMC | 65.42% | LiPF$_6$ | 12.50% | FEC | 2.0% |
| Example 22 | EC | 20% | DMC | 65.40% | LiPF$_6$ | 12.50% | FEC | 2.0% |
| Example 23 | EC | 20% | DMC | 65.37% | LiPF$_6$ | 12.50% | FEC | 2.0% |
| Example 24 | EC | 20% | DMC | 64.86% | LiPF$_6$ | 12.50% | FEC + VC = 4:1 (m:m) | 2.5% |
| Example 25 | EC | 20% | DMC | 64.86% | LiPF$_6$ | 12.50% | FEC + DTD = 4:1 (m:m) | 2.5% |
| Example 26 | EC | 20% | DMC | 64.86% | LiPF$_6$ | 12.50% | FEC + PS = 4:1 (m:m) | 2.5% |
| Example 27 | EC | 20% | DMC | 67.36% | LiPF$_6$ | 12.50% | FEC | 0.0% |
| Example 28 | EC | 20% | DMC | 66.86% | LiPF$_6$ | 12.50% | FEC | 0.5% |
| Example 29 | EC | 20% | DMC | 66.36% | LiPF$_6$ | 12.50% | FEC | 1.0% |
| Example 30 | EC | 20% | DMC | 64.36% | LiPF$_6$ | 12.50% | FEC | 3.0% |

TABLE 1-continued

| | | | | | | | | |
|---|---|---|---|---|---|---|---|---|
| Example 31 | EC | 20% | DMC | 65.36% | LiPF$_6$ | 12.50% | FEC | 2.0% |
| Example 32 | EC | 20% | DMC | 65.36% | LiPF$_6$ | 12.50% | FEC | 2.0% |
| Example 33 | EC | 20% | DMC | 65.36% | LiPF$_6$ | 12.50% | FEC | 2.0% |
| Example 34 | EC | 20% | DMC | 65.36% | LiPF$_6$ | 12.50% | FEC | 2.0% |
| Example 35 | EC | 20% | DMC | 65.36% | LiPF$_6$ | 12.50% | FEC | 2.0% |
| Example 36 | EC | 20% | DMC | 65.36% | LiPF$_6$ | 12.50% | FEC | 2.0% |
| Comparative Example 1 | EC | 20% | DMC | 65.50% | LiPF$_6$ | 12.50% | FEC | 2.0% |
| Comparative Example 2 | EC | 20% | DMC | 65.50% | LiPF$_6$ | 12.50% | FEC | 2.0% |
| Comparative Example 3 | EC | 20% | DMC | 65.05% | LiPF$_6$ | 12.50% | FEC | 2.0% |
| Comparative Example 4 | EC | 20% | DMC | 65.00% | LiPF$_6$ | 12.50% | FEC | 2.0% |

| | Soluble Me salt | | | | Soluble difluoroxalate borate | | | |
|---|---|---|---|---|---|---|---|---|
| No. | Name | Percentage | Name | Percentage | Name | Percentage | Name | Percentage |
| Example 1 | Mn(BF$_4$)$_2$ | 0.02% | Mn(NO$_3$)$_2$ | 0.03% | LiDFOB | 0% | Mn(DFOB)$_2$ | 0.05% |
| Example 2 | Mn(BF$_4$)$_2$ | 0.02% | Mn(NO$_3$)$_2$ | 0.04% | LiDFOB | 0% | Mn(DFOB)$_2$ | 0.05% |
| Example 3 | Mn(BF$_4$)$_2$ | 0.02% | Mn(NO$_3$)$_2$ | 0.05% | LiDFOB | 0% | Mn(DFOB)$_2$ | 0.05% |
| Example 4 | Mn(BF$_4$)$_2$ | 0.02% | Mn(NO$_3$)$_2$ | 0.06% | LIDFOB | 0% | Mn(DFOB)$_2$ | 0.05% |
| Example 5 | Mn(BF$_4$)$_2$ | 0.03% | Mn(NO$_3$)$_2$ | 0.06% | LiDFOB | 0% | Mn(DFOB)$_2$ | 0.05% |
| Example 6 | Mn(BF$_4$)$_2$ | 0.04% | Mn(NO$_3$)$_2$ | 0.05% | LiDFOB | 0% | Mn(DFOB)$_2$ | 0.05% |
| Example 7 | Mn(BF$_4$)$_2$ | 0.05% | Mn(NO$_3$)$_2$ | 0.05% | LIDFOB | 0% | Mn(DFOB)$_2$ | 0.05% |
| Example 8 | Mn(BF$_4$)$_2$ | 0.06% | Mn(NO$_3$)$_2$ | 0.05% | LiDFOB | 0% | Mn(DFOB)$_2$ | 0.05% |
| Example 9 | Mn(BF$_4$)$_2$ | 0.08% | Mn(NO$_3$)$_2$ | 0.08% | LIDFOB | 0% | Mn(DFOB)$_2$ | 0.05% |
| Example 10 | Mn(BF$_4$)$_2$ | 0.10% | Mn(NO$_3$)$_2$ | 0.10% | LIDFOB | 0% | Mn(DFOB)$_2$ | 0.05% |
| Example 11 | Mn(BF$_4$)$_2$ | 0.13% | Mn(NO$_3$)$_2$ | 0.13% | LIDFOB | 0% | Mn(DFOB)$_2$ | 0.05% |
| Example 12 | Mn(BF$_4$)$_2$ | 0.03% | Mn(NO$_3$)$_2$ | 0.06% | LIDFOB | 0.01% | Mn(DFOB)$_2$ | 0.05% |
| Example 13 | Mn(BF$_4$)$_2$ | 0.03% | Mn(NO$_3$)$_2$ | 0.06% | LiDFOB | 0.02% | Mn(DFOB)$_2$ | 0.05% |
| Example 14 | Mn(BF$_4$)$_2$ | 0.03% | Mn(NO$_3$)$_2$ | 0.06% | LiDFOB | 0.03% | Mn(DFOB)$_2$ | 0.05% |
| Example 15 | Mn(BF$_4$)$_2$ | 0.03% | Mn(NO$_3$)$_2$ | 0.06% | LiDFOB | 0.05% | Mn(DFOB)$_2$ | 0.05% |
| Example 16 | Mn(BF$_4$)$_2$ | 0.03% | Mn(NO$_3$)$_2$ | 0.06% | LiDFOB | 0.10% | Mn(DFOB)$_2$ | 0.05% |
| Example 17 | Mn(BF$_4$)$_2$ | 0.03% | Mn(NO$_3$)$_2$ | 0.06% | LIDFOB | 0.25% | Mn(DFOB)$_2$ | 0.05% |
| Example 18 | Mn(BF$_4$)$_2$ | 0.05% | Mn(NO$_3$)$_2$ | 0% | LiDFOB | 0% | Mn(DFOB)$_2$ | 0.05% |
| Example 19 | Mn(BF$_4$)$_2$ | 0.08% | Mn(NO$_3$)$_2$ | 0% | LIDFOB | 0% | Mn(DFOB)$_2$ | 0.05% |
| Example 20 | Mn(BF$_4$)$_2$ | 0.10% | Mn(NO$_3$)$_2$ | 0% | LiDFOB | 0% | Mn(DFOB)$_2$ | 0.05% |
| Example 21 | Mn(BF$_4$)$_2$ | 0% | Mn(NO$_3$)$_2$ | 0.03% | LiDFOB | 0% | Mn(DFOB)$_2$ | 0.05% |
| Example 22 | Mn(BF$_4$)$_2$ | 0% | Mn(NO$_3$)$_2$ | 0.05% | LiDFOB | 0% | Mn(DFOB)$_2$ | 0.05% |
| Example 23 | Mn(BF$_4$)$_2$ | 0% | Mn(NO$_3$)$_2$ | 0.08% | LiDFOB | 0% | Mn(DFOB)$_2$ | 0.05% |
| Example 24 | Mn(BF$_4$)$_2$ | 0.03% | Mn(NO$_3$)$_2$ | 0.06% | LIDFOB | 0% | Mn(DFOB)$_2$ | 0.05% |
| Example 25 | Mn(BF$_4$)$_2$ | 0.03% | Mn(NO$_3$)$_2$ | 0.06% | LIDFOB | 0% | Mn(DFOB)$_2$ | 0.05% |
| Example 26 | Mn(BF$_4$)$_2$ | 0.03% | Mn(NO$_3$)$_2$ | 0.06% | LIDFOB | 0% | Mn(DFOB)$_2$ | 0.05% |
| Example 27 | Mn(BF$_4$)$_2$ | 0.03% | Mn(NO$_3$)$_2$ | 0.06% | LIDFOB | 0% | Mn(DFOB)$_2$ | 0.05% |

TABLE 1-continued

| | | | | | | | | |
|---|---|---|---|---|---|---|---|---|
| Example 28 | Mn(BF₄)₂ | 0.03% | Mn(NO₃)₂ | 0.06% | LIDFOB | 0% | Mn(DFOB)₂ | 0.05% |
| Example 29 | Mn(BF₄)₂ | 0.03% | Mn(NO₃)₂ | 0.06% | LIDFOB | 0% | Mn(DFOB)₂ | 0.05% |
| Example 30 | Mn(BF₄)₂ | 0.03% | Mn(NO₃)₂ | 0.06% | LIDFOB | 0% | Mn(DFOB)₂ | 0.05% |
| Example 31 | Ni(BF₄)₂ | 0.03% | Ni(NO₃)₂ | 0.06% | LIDFOB | 0% | Ni(DFOB)₂ | 0.05% |
| Example 32 | Co(BF₄)₂ | 0.03% | Co(NO₃)₂ | 0.06% | LIDFOB | 0% | Co(DFOB)₂ | 0.05% |
| Example 33 | Fe(BF₄)₂ | 0.03% | Fe(NO₃)₂ | 0.06% | LIDFOB | 0% | Fe(DFOB)₂ | 0.05% |
| Example 34 | Al(BF₄)₃ | 0.03% | Al(NO₃)₃ | 0.06% | LIDFOB | 0% | Al(DFOB)₃ | 0.05% |
| Example 35 | NaBF₄ | 0.03% | NaNO₃ | 0.06% | LiDFOB | 0% | NaDFOB | 0.05% |
| Example 36 | KBF₄ | 0.03% | KNO₃ | 0.06% | LiDFOB | 0% | KDFOB | 0.05% |
| Comparative Example 1 | Mn(BF₄)₂ | 0% | Mn(NO₃)₂ | 0% | LiDFOB | 0% | Mn(DFOB)₂ | 0% |
| Comparative Example 2 | Mn(BF₄)₂ | 0% | Mn(NO₃)₂ | 0% | LIDFOB | 0.05% | Mn(DFOB)₂ | 0% |
| Comparative Example 3 | Mn(BF₄)₂ | 0.20% | Mn(NO₃)₂ | 0.20% | LIDFOB | 0.05% | Mn(DFOB)₂ | 0% |
| Comparative Example 4 | Mn(BF₄)₂ | 0.20% | Mn(NO₃)₂ | 0.20% | LIDFOB | 0.05% | Mn(DFOB)₂ | 0.05% |

TABLE 2

| No. | D1 (ppm) | D1/ D2 | D2 (ppm) | D3 (ppm) | D2/ D3 | D4 (ppm) | D2/ D4 | D5 (ppm) | D5/ D2 | Capacity retention rate after 600 cycles at 25° C. | Capacity retention rate after 600 cycles at 45° C. | Initial direct current internal resistance (mΩ) | Volume swelling rate after storage at 60° C. for 30 days |
|---|---|---|---|---|---|---|---|---|---|---|---|---|---|
| Example 1 | 224 | 0.54 | 416 | 152 | 2.7 | 208 | 2.0 | 20,000 | 48.0 | 92.5% | 89.0% | 13.5 | 13.0% |
| Example 2 | 254 | 0.61 | 416 | 152 | 2.7 | 277 | 1.5 | 20,000 | 48.0 | 93.1% | 90.1% | 13.8 | 12.5% |
| Example 3 | 285 | 0.68 | 416 | 152 | 2.7 | 347 | 1.2 | 20,000 | 48.0 | 94.7% | 90.4% | 13.9 | 12.1% |
| Example 4 | 316 | 0.76 | 416 | 152 | 2.7 | 416 | 1.0 | 20,000 | 48.0 | 96.1% | 91.7% | 14.3 | 11.0% |
| Example 5 | 340 | 0.82 | 416 | 228 | 1.8 | 416 | 1.0 | 20,000 | 48.0 | 97.3% | 92.3% | 14.5 | 10.9% |
| Example 6 | 333 | 0.80 | 416 | 304 | 1.4 | 347 | 1.2 | 20,000 | 48.0 | 96.9% | 91.5% | 15.5 | 11.0% |
| Example 7 | 357 | 0.86 | 416 | 380 | 1.1 | 347 | 1.2 | 20,000 | 48.0 | 96.1% | 91.2% | 16.1 | 11.3% |
| Example 8 | 381 | 0.91 | 416 | 456 | 0.9 | 347 | 1.2 | 20,000 | 48.0 | 95.7% | 90.9% | 16.5 | 11.5% |
| Example 9 | 521 | 1.25 | 416 | 608 | 0.7 | 554 | 0.8 | 20,000 | 48.0 | 95.2% | 90.6% | 16.7 | 11.9% |
| Example 10 | 631 | 1.51 | 416 | 760 | 0.5 | 693 | 0.6 | 20,000 | 48.0 | 94.8% | 90.4% | 16.9 | 12.2% |
| Example 11 | 795 | 1.91 | 416 | 987 | 0.4 | 901 | 0.5 | 20,000 | 48.0 | 94.4% | 89.3% | 17.3 | 12.5% |
| Example 12 | 340 | 0.66 | 512 | 228 | 2.2 | 416 | 1.2 | 20,000 | 39.1 | 96.4% | 92.1% | 14.9 | 11.2% |
| Example 13 | 340 | 0.56 | 607 | 228 | 2.7 | 416 | 1.5 | 20,000 | 33.0 | 96.1% | 91.8% | 15.1 | 11.5% |
| Example 14 | 340 | 0.48 | 702 | 228 | 3.1 | 416 | 1.7 | 20,000 | 28.5 | 95.7% | 91.3% | 15.4 | 11.9% |
| Example 15 | 340 | 0.38 | 892 | 228 | 3.9 | 416 | 2.1 | 20,000 | 22.4 | 95.3% | 90.6% | 15.7 | 12.4% |
| Example 16 | 340 | 0.25 | 1368 | 228 | 6.0 | 416 | 3.3 | 20,000 | 14.6 | 94.6% | 90.1% | 15.9 | 12.7% |
| Example 17 | 340 | 0.12 | 2796 | 228 | 12.3 | 416 | 6.7 | 20,000 | 7.2 | 94.1% | 89.3% | 16.3 | 13.1% |
| Example 18 | 204 | 0.49 | 416 | 380 | 1.1 | / | / | 20,000 | 48.0 | 94.5% | 90.5% | 16.8 | 11.5% |
| Example 19 | 276 | 0.66 | 416 | 608 | 0.7 | / | / | 20,000 | 48.0 | 94.1% | 90.2% | 17.1 | 11.7% |

TABLE 2-continued

| No. | D1 (ppm) | D1/ D2 | D2 (ppm) | D3 (ppm) | D2/ D3 | D4 (ppm) | D2/ D4 | D5 (ppm) | D5/ D2 | Capacity retention rate after 600 cycles at 25° C. | Capacity retention rate after 600 cycles at 45° C. | Initial direct current internal resistance (mΩ) | Volume swelling rate after storage at 60° C. for 30 days |
|---|---|---|---|---|---|---|---|---|---|---|---|---|---|
| Example 20 | 324 | 0.78 | 416 | 760 | 0.5 | / | / | 20,000 | 48.0 | 93.6% | 90.0% | 17.3 | 12.1% |
| Example 21 | 176 | 0.42 | 416 | / | / | 208 | 2.0 | 20,000 | 48.0 | 91.3% | 88.5% | 13.8 | 13.7% |
| Example 22 | 237 | 0.57 | 416 | / | / | 347 | 1.2 | 20,000 | 48.0 | 91.1% | 88.4% | 14.1 | 13.9% |
| Example 23 | 329 | 0.79 | 416 | / | / | 554 | 0.8 | 20,000 | 48.0 | 91.6% | 87.3% | 14.8 | 14.3% |
| Example 24 | 340 | 0.82 | 416 | 228 | 1.8 | 416 | 1.0 | 20,000 | 48.0 | 98.1% | 94.1% | 15.6 | 11.5% |
| Example 25 | 340 | 0.82 | 416 | 228 | 1.8 | 416 | 1.0 | 20,000 | 48.0 | 98.3% | 94.6% | 14.2 | 10.4% |
| Example 26 | 340 | 0.82 | 416 | 228 | 1.8 | 416 | 1.0 | 20,000 | 48.0 | 98.1% | 94.2% | 14.0 | 10.5% |
| Example 27 | 340 | 0.82 | 416 | 228 | 1.8 | 416 | 1.0 | 0 | 0.0 | 95.1% | 90.5% | 12.7 | 9.3% |
| Example 28 | 340 | 0.82 | 416 | 228 | 1.8 | 416 | 1.0 | 5000 | 12.0 | 95.7% | 91.4% | 12.1 | 9.3% |
| Example 29 | 340 | 0.82 | 416 | 228 | 1.8 | 416 | 1.0 | 10,000 | 24.0 | 96.3% | 91.9% | 13.9 | 10.2% |
| Example 30 | 340 | 0.82 | 416 | 228 | 1.8 | 416 | 1.0 | 30,000 | 72.0 | 97.1% | 92.1% | 14.8 | 11.1% |
| Example 31 | 357 | 0.87 | 412 | 224 | 1.8 | 407 | 1.0 | 20,000 | 48.6 | 97.1% | 92.1% | 14.9 | 11.2% |
| Example 32 | 358 | 0.87 | 411 | 224 | 1.8 | 407 | 1.0 | 20,000 | 48.6 | 96.8% | 91.9% | 15.1 | 11.4% |
| Example 33 | 344 | 0.83 | 415 | 227 | 1.8 | 414 | 1.0 | 20,000 | 48.2 | 96.5% | 91.4% | 15.2 | 11.8% |
| Example 34 | 135 | 0.29 | 469 | 272 | 1.7 | 524 | 0.9 | 20,000 | 42.6 | 95.7% | 91.2% | 15.3 | 11.4% |
| Example 35 | 297 | 0.69 | 428 | 237 | 1.8 | 438 | 1.0 | 20,000 | 46.7 | 94.2% | 90.2% | 15.7 | 12.6% |
| Example 36 | 436 | 1.12 | 389 | 207 | 1.9 | 368 | 1.1 | 20,000 | 51.4 | 94.6% | 90.1% | 15.5 | 12.5% |
| Comparative Example 1 | / | / | / | / | / | / | / | 20,000 | / | 75.0% | 72.1% | 19.0 | 19.3% |
| Comparative Example 2 | / | / | 476 | / | / | / | / | 20,000 | 42.0 | 79.5% | 74.4% | 17.5 | 18.8% |
| Comparative Example 3 | 1094 | 2.30 | 476 | 1519 | 0.3 | 1386 | 0.3 | 20,000 | 42.0 | 77.5% | 75.5% | 18.3 | 17.4% |
| Comparative Example 4 | 1178 | 1.32 | 892 | 1519 | 0.6 | 1386 | 0.6 | 20,000 | 22.4 | 76.5% | 73.5% | 18.6 | 18.1% |

It can be seen from the test results of Examples 1 to 30 that when the non-aqueous electrolyte contains the first cations and the first anions in this application and the mass concentration D1 ppm of the first cations and the mass concentration D2 ppm of the first anions satisfy that D1 is 0.5 to 870 and that D1/D2 is 0.02 to 2, the first cations do not deteriorate the electrochemical performance of the secondary battery, and with the synergistic effect of the first cations and first anions, the non-aqueous electrolyte in this application also enables the secondary battery to have high cycling capacity retention rate, low internal resistance, and low volume swelling rate.

It can be seen from the test results of Comparative Examples 1 to 4 that when the non-aqueous electrolyte contains only the first anions but contains no first cations or when the non-aqueous electrolyte contains too many first cations, the cycling performance, kinetic performance, and storage performance of the secondary battery cannot all be improved.

It can also be seen from the test results of Examples 24 to 30 that the non-aqueous electrolyte further containing the first additive and/or the second additive in this application helps to further improve at least one of the cycling performance, kinetic performance, and storage performance of the secondary battery.

It can also be seen from the test results of Examples 5, and 31 to 36 that when $Me^{n+}$ satisfies that the difference between the standard reduction potential of $Me^{n+}$ (vs. standard hydrogen electrode potential) and the standard reduction potential of $Li^+$ (vs. standard hydrogen electrode potential: −3.04 V) is 1.0 V or more, and particularly, $Me^{n+}$ is at least one of $Ni^{2+}$, $Co^{2+}$, $Mn^{2+}$, $Al^{3+}$, and $Fe^{2+}$, comprehensive performance of the secondary battery is improved. In Example 35 and Example 36, $Na^+$ and $K^+$ were used as the first cations, respectively, and their standard reduction potentials were close to the standard reduction potential of $Li^+$. Therefore, $Na^+$ and $K^+$ have poor effects on increasing the electronic conductivity and reducing irreversible consumption of active lithium ions and hence have poor effects on improving the comprehensive performance of the secondary battery.

It should be noted that this application is not limited to the foregoing embodiments. The foregoing embodiments are merely examples, and embodiments having substantially the same constructions and the same effects as the technical idea within the scope of the technical solutions of this application are all included in the technical scope of this application. In addition, without departing from the essence of this application, various modifications made to the embodiments that can be conceived by persons skilled in the art, and other manners constructed by combining some of the constituent elements in the embodiments are also included in the scope of this application.

What is claimed is:

1. A non-aqueous electrolyte containing a non-aqueous solvent and lithium ions, first cations, and first anions dissolved therein, wherein the first cation is a metal cation $Me^{n+}$ other than the lithium ion, n representing a chemical valence of the metal cation; the first anion is a difluorooxalate borate anion $DFOB^-$; mass concentration of the first cations in the non-aqueous electrolyte is D1 ppm, and mass concentration of the first anions in the non-aqueous electrolyte is D2 ppm, both based on total mass of the non-aqueous electrolyte; and the non-aqueous electrolyte satisfies that D1 is 0.5 to 870 and that D1/D2 is 0.02 to 2;

wherein $Me^{n+}$ represents at least one of $Ni^{2+}$, $Co^{2+}$, $Mn^{2+}$, $Al^{3+}$, and $Fe^{2+}$.

2. The non-aqueous electrolyte according to claim 1, wherein

D1 is 100 to 870;

D1/D2 is 0.3 to 2; and/or

D2 is 1 to 3000.

3. The non-aqueous electrolyte according to claim 1, wherein the non-aqueous electrolyte further contains second anions, wherein the second anion is a tetrafluoroborate anion $BF_4^-$, and mass concentration of the second anions in the non-aqueous electrolyte is D3 ppm based on the total mass of the non-aqueous electrolyte.

4. The non-aqueous electrolyte according to claim 1, wherein the non-aqueous electrolyte further contains third anions, wherein the third anion comprises at least one of perchlorate anion $ClO_4^-$, bis(trifluoromethanesulfonyl)imide anion $N(SO_2CF_3)_2^-$, $NO_3^-$, and $SO_4^{2-}$ and optionally comprises at least one of $NO_3^-$ and $SO_4^{2-}$; and mass concentration of the third anions in the non-aqueous electrolyte is D4 ppm based on the total mass of the non-aqueous electrolyte.

5. The non-aqueous electrolyte according to claim 1, wherein the non-aqueous electrolyte further contains fourth anions, wherein the fourth anion comprises hexafluorophosphate anion PFC, bis(fluorosulfonyl)imide anion $N(SO_2F)_2^-$, or a combination thereof.

6. The non-aqueous electrolyte according to claim 5, wherein the non-aqueous electrolyte further contains fifth anions, wherein the fifth anion comprises at least one of dioxalate borate anion $BOB^-$, hexafluoroarsenate anion $AsF_6^-$, trifluoromethanesulfonate anion $CF_3SO_3^-$, difluorophosphate anion $PO_2F_2^-$, difluorodioxalate phosphate anion $DODFP^-$, and tetrafluoroxalate phosphate anion OTFP.

7. The non-aqueous electrolyte according to claim 6, wherein the fifth anions comprise difluorophosphate anions $PO_2F_2$.

8. The non-aqueous electrolyte according to claim 1, wherein the non-aqueous solvent comprises a cyclic carbonate compound and a linear carbonate compound, wherein in the non-aqueous electrolyte, mass percentage of the cyclic carbonate compound is E1 and mass percentage of the linear carbonate compound is E2, both based on the total mass of the non-aqueous electrolyte;

E1 is 5% to 40%; and

E2 is 40% to 85%.

9. The non-aqueous electrolyte according to claim 8, wherein the non-aqueous solvent further comprises an ether compound, wherein the ether compound comprises at least one of tetrahydrofuran, 2-methyltetrahydrofuran, 1,3-dioxolane, ethylene glycol monomethyl ether, dimethoxyethane, tetraethylene glycol dimethyl ether, dimethoxymethane, and diglyme, and mass percentage of the ether compound in the non-aqueous electrolyte is E3 based on the total mass of the non-aqueous electrolyte.

10. The non-aqueous electrolyte according to claim 1, wherein the non-aqueous electrolyte further contains a first additive, wherein the first additive is fluoroethylene carbonate, and mass concentration of the first additive in the non-aqueous electrolyte is D5 ppm based on the total mass of the non-aqueous electrolyte.

11. The non-aqueous electrolyte according to claim 1, wherein the non-aqueous electrolyte further contains a second additive, wherein the second additive comprises at least one of vinylidene carbonate, lithium oxalate, vinyl sulfate, and 1,3-propane sultone.

12. A preparation method of non-aqueous electrolyte, the preparation method comprising:

mixing a non-aqueous solvent, a lithium salt, a soluble Me salt, soluble difluorooxalate borate, and an optional additive to uniformity to obtain a non-aqueous electrolyte, wherein Me represents a metal element other than element lithium;

wherein the non-aqueous electrolyte contains the non-aqueous solvent and lithium ions, first cations, and first anions dissolved therein, wherein the first cation is a metal cation $Me^{n+}$ other than the lithium ion, n representing a chemical valence of the metal cation; the first anion is a difluorooxalate borate anion $DFOB^-$; mass concentration of the first cations in the non-aqueous electrolyte is D1 ppm, and mass concentration of the first anions in the non-aqueous electrolyte is D2 ppm, both based on total mass of the non-aqueous electrolyte; and the non-aqueous electrolyte satisfies that D1 is 0.5 to 870 and that D1/D2 is 0.02 to 2.

13. The preparation method according to claim 12, wherein a difference between a standard reduction potential of $Me^{n+}$ and a standard reduction potential of $Li^+$ is 1.0 V or more.

14. The preparation method according to claim 12, wherein the soluble Me salt comprises at least one of $Me(DFOB)_n$, $Me(BF_4)_n$, $Me(ClO_4)_n$, $Me[N(SO_2CF_3)_2]_n$, $Me(NO_3)_{n/2}$, $Me(SO_4)_{n/2}$, $Me(PF_6)_n$, $Me[N(SO_2F)_2]_n$, $Me(BOB)_n$, $Me(AsF_6)_n$, $Me(CF_3SO_3)_n$, $Me(PO_2F_2)_n$, $Me(DODFP)_n$, and $Me(OTFP)_n$;

the soluble difluorooxalate borate comprises at least one of $Me(DFOB)_n$ and LiDFOB;

the non-aqueous solvent comprises a cyclic carbonate compound and a linear carbonate compound;

the lithium salt comprises a first lithium salt, the first lithium salt comprising lithium hexafluorophosphate, lithium bis(fluorosulfonyl)imide, or a combination thereof, and optionally, the lithium salt further comprises a second lithium salt, the second lithium salt comprising at least one of lithium bis(oxalato)borate, lithium tetrafluoroborate, lithium bis(trifluoromethanesulfonyl)imide, lithium perchlorate, lithium hexafluoroarsenate, lithium trifluoromethanesulfonate, lithium difluorophosphate, lithium difluorobis(oxalato)phosphate, and lithium tetrafluoro(oxalato)phosphate; and/or the additive comprises at least one of a first additive and a second additive, wherein the first additive is fluoroethylene carbonate, and the second additive comprises at least one of vinylidene carbonate, lithium oxalate, vinyl sulfate, and 1,3-propane sultone.

15. The preparation method according to claim 12, wherein $Me^{n+}$ represents at least one of $Ni^{2+}$, $Co^{2+}$, $Mn^{2+}$, $Al^{3+}$, and $Fe^{2+}$.

16. The preparation method according to claim 12, wherein the non-aqueous solvent further comprises an ether compound selected from at least one of tetrahydrofuran, 2-methyltetrahydrofuran, 1,3-dioxolane, ethylene glycol monomethyl ether, dimethoxyethane, tetraethylene glycol dimethyl ether, dimethoxymethane, and diglyme.

17. A secondary battery comprising a positive electrode plate, a negative electrode plate, and a non-aqueous electrolyte, wherein the non-aqueous electrolyte is the non-aqueous electrolyte according to claim 1 or an anon-aqueous electrolyte obtained by using the preparation method according to claim 12.

18. The secondary battery according to claim 17, wherein the positive electrode plate comprises a layered material having a molecular formula of $Li_aNi_bCo_cMn_dAl_eM_fO_gA_h$, M represents transition metal site doping cation, A represents oxygen site doping anion, $0.8 \leq a \leq 1.2$, $0 \leq b \leq 1$, $0 \leq c \leq 1$, $0 \leq d \leq 1$, $0 \leq e \leq 1$, $0 \leq f \leq 0.2$, $0 \leq g \leq 2$, $0 \leq h \leq 2$, $b+c+d+e+f+f=1$, and $g+h=2$.

19. An electric apparatus comprising the secondary battery according to claim 17.

* * * * *